(12) United States Patent
Zaniker et al.

(10) Patent No.: US 12,336,625 B2
(45) Date of Patent: *Jun. 24, 2025

(54) SYSTEM AND METHOD FOR ENABLING A USER TO SELECT A SECURABLE DEVICE THROUGHOUT MULTIPLE SECURABLE DEVICE STATIONS

(71) Applicant: Best Lockers, LLC, Orlando, FL (US)

(72) Inventors: John Zaniker, Severna Park, MD (US); Dennis Toibero, Laurel, MD (US); Wes Swogger, Fairfax Station, VA (US)

(73) Assignee: BEST LOCKERS, LLC, Orlando, FL (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/028,554

(22) Filed: Sep. 22, 2020

(65) Prior Publication Data

US 2021/0244180 A1    Aug. 12, 2021

Related U.S. Application Data

(63) Continuation of application No. 15/652,124, filed on Jul. 17, 2017, now Pat. No. 10,779,642, which is a
(Continued)

(51) Int. Cl.
*A47B 47/00* (2006.01)
*A47B 81/00* (2006.01)
(Continued)

(52) U.S. Cl.
CPC .............. *A47B 47/00* (2013.01); *A47B 81/00* (2013.01); *A47B 96/00* (2013.01); *G06Q 20/18* (2013.01);
(Continued)

(58) Field of Classification Search
CPC .... G06Q 20/385; G06Q 10/08; G06Q 10/087; G06Q 20/32; G06Q 30/0645; G06K 5/00;
(Continued)

(56) References Cited

U.S. PATENT DOCUMENTS 3,789,968 A    2/1974    Inoue et al.
4,698,630 A    10/1987   Ellsberg
(Continued)

*Primary Examiner* — Olusegun Goyea
(74) *Attorney, Agent, or Firm* — DLA Piper LLP US

(57) ABSTRACT

A system and method of provisioning a securable device may include providing a plurality of securable device stations, each securable device station including (i) a controller and (ii) a set of securable devices in local communication with the controller, the controller being configured to enable a user to initiate access to a securable device from a set of securable devices. In response to a first controller of a first securable device station receiving (i) an access indicia and (ii) rental parameter that enables the user to access a securable device located in at least two of the securable device stations from a user, the first controller may communicate the access indicia and rental parameter to a network address that enables, by a second controller, the user to access a securable device at the second securable device station as provided by the rental parameter.

11 Claims, 12 Drawing Sheets

Related U.S. Application Data continuation of application No. 14/165,291, filed on Jan. 27, 2014, now Pat. No. 9,706,835.

(60) Provisional application No. 61/808,523, filed on Apr. 4, 2013.

(51) Int. Cl.
| | |
|---|---|
| *A47B 96/00* | (2006.01) |
| *G06Q 20/18* | (2012.01) |
| *G06Q 20/32* | (2012.01) |
| *G06Q 20/34* | (2012.01) |
| *G06Q 20/40* | (2012.01) |
| *G06Q 30/0645* | (2023.01) |
| *G07F 5/26* | (2006.01) |
| *G07F 7/04* | (2006.01) |
| *G07F 7/10* | (2006.01) |
| *G07F 17/12* | (2006.01) |

(52) U.S. Cl.
CPC ..... *G06Q 20/3274* (2013.01); *G06Q 20/3278* (2013.01); *G06Q 20/342* (2013.01); *G06Q 20/347* (2013.01); *G06Q 20/352* (2013.01); *G06Q 20/4012* (2013.01); *G06Q 20/40145* (2013.01); *G06Q 30/0645* (2013.01); *G07F 5/26* (2013.01); *G07F 7/04* (2013.01); *G07F 7/10* (2013.01); *G07F 17/12* (2013.01)

(58) Field of Classification Search
CPC .......... G06K 7/10; G05B 19/00; G07F 9/001; G07F 17/12; G07F 9/105; G07C 9/00309; G07C 9/257; G07C 9/27; G06F 17/13
USPC ......... 705/28; 235/381, 382; 340/5.54, 5.73, 340/540, 545.1, 4.14; 312/215; 700/17
See application file for complete search history.

(56) References Cited

U.S. PATENT DOCUMENTS

| | | | | |
|---|---|---|---|---|
| 4,866,661 A | | 9/1989 | De Prins et al. | |
| 5,169,222 A | * | 12/1992 | Bollore | G07C 9/23 312/328 |
| 5,231,272 A | * | 7/1993 | Mardon | G07F 17/12 235/382 |
| 5,345,379 A | * | 9/1994 | Brous | G06Q 20/3437 235/382 |
| 5,894,277 A | * | 4/1999 | Keskin | G07C 9/00896 235/382 |
| 5,946,660 A | | 8/1999 | McCarty | G07F 7/00 705/5 |
| 6,185,773 B1 | * | 2/2001 | Goedde | G07C 9/28 340/5.1 |
| 6,655,180 B2 | * | 12/2003 | Gokcebay | E05B 63/06 70/432 |
| 6,694,217 B2 | * | 2/2004 | Bloom | G07C 9/21 700/242 |
| 6,791,450 B2 | * | 9/2004 | Gokcebay | G07F 17/13 235/382 |
| 6,806,807 B2 | * | 10/2004 | Cayne | G07C 9/257 340/5.52 |
| 6,879,243 B1 | * | 4/2005 | Booth | E05B 47/026 340/5.73 |
| 6,882,269 B2 | * | 4/2005 | Moreno | A47G 29/141 340/568.1 |
| 6,999,825 B2 | * | 2/2006 | Inomata | G07F 17/13 340/5.73 |
| 7,068,149 B2 | | 6/2006 | Lee et al. | |
| 7,108,171 B1 | | 9/2006 | Ergo et al. | |
| 7,176,782 B2 | * | 2/2007 | Shitan | G07C 9/00912 340/5.5 |
| 7,323,967 B2 | | 1/2008 | Booth et al. | |
| 7,445,300 B2 | | 11/2008 | Collins et al. | |
| 7,477,132 B2 | * | 1/2009 | Mayer | G07C 9/38 235/382 |
| 7,705,731 B2 | | 4/2010 | Trammell, III | |
| 7,979,716 B2 | * | 7/2011 | Fiske | G06F 21/34 713/184 |
| 8,410,901 B2 | * | 4/2013 | Mullin | G06Q 30/0645 340/5.7 |
| 8,639,578 B2 | | 1/2014 | Barber et al. | |
| 8,854,184 B2 | * | 10/2014 | Mullin | G07C 9/33 340/5.7 |
| 8,854,185 B2 | * | 10/2014 | Mullin | G06Q 20/206 340/5.7 |
| 8,890,110 B2 | | 11/2014 | Park | |
| 8,892,463 B2 | * | 11/2014 | Mullin | G06Q 30/0645 705/18 |
| 8,970,344 B2 | * | 3/2015 | Payson | G07C 9/00912 340/5.2 |
| 2002/0027160 A1 | * | 3/2002 | Hara | G07C 9/27 235/375 |
| 2002/0042665 A1 | * | 4/2002 | Kakuta | A47G 29/141 700/214 |
| 2002/0080030 A1 | * | 6/2002 | Inomata | G07F 17/0014 340/542 |
| 2002/0180582 A1 | * | 12/2002 | Nielsen | G07C 9/21 340/5.6 |
| 2002/0184497 A1 | * | 12/2002 | Gage | G06Q 30/0283 713/168 |
| 2003/0025590 A1 | * | 2/2003 | Gokcebay | G06Q 40/04 340/5.73 |
| 2003/0141840 A1 | * | 7/2003 | Sanders | G07F 15/006 320/107 |
| 2003/0222760 A1 | * | 12/2003 | Hara | G07F 17/0042 340/5.73 |
| 2003/0227550 A1 | | 12/2003 | Manico et al. | |
| 2004/0199284 A1 | * | 10/2004 | Hara | G07F 17/13 700/215 |
| 2004/0267640 A1 | * | 12/2004 | Bong | G07F 17/0042 705/28 |
| 2005/0040931 A1 | * | 2/2005 | Shitan | G07C 9/00309 340/5.5 |
| 2005/0190037 A1 | * | 9/2005 | Shitan | G07F 17/12 340/5.5 |
| 2007/0245369 A1 | * | 10/2007 | Thompson | H04L 63/10 725/30 |
| 2008/0024272 A1 | * | 1/2008 | Fiske | G07C 9/00563 340/5.82 |
| 2008/0170355 A1 | * | 7/2008 | Kyriakides | H02J 7/0013 361/626 |
| 2009/0033456 A1 | * | 2/2009 | Castillo | G07C 11/00 340/5.2 |
| 2009/0121832 A1 | * | 5/2009 | Mullin | G07C 9/00912 340/5.54 |
| 2009/0141117 A1 | | 6/2009 | Elberbaum | |
| 2009/0267564 A1 | * | 10/2009 | Gerber | H02J 7/0013 320/114 |
| 2010/0102780 A1 | | 4/2010 | Koh | |
| 2010/0176919 A1 | * | 7/2010 | Myers | G07C 9/00857 340/5.2 |
| 2010/0228405 A1 | | 9/2010 | Morgal et al. | |
| 2011/0012709 A1 | * | 1/2011 | Payson | G07C 9/00912 340/5.61 |
| 2011/0074541 A1 | * | 3/2011 | Jones | G07C 9/27 340/5.6 |
| 2011/0130134 A1 | | 6/2011 | Van Rysselberghe | |
| 2011/0288685 A1 | * | 11/2011 | Usem | G07F 9/006 70/159 |
| 2011/0301748 A1 | | 12/2011 | Lecarpentier | |
| 2012/0078413 A1 | * | 3/2012 | Baker, Jr. | G07F 17/12 700/232 |
| 2012/0098493 A1 | | 4/2012 | Budike | |
| 2012/0138548 A1 | | 6/2012 | Young | |
| 2013/0054391 A1 | * | 2/2013 | Hipolito | G06Q 20/20 705/17 |
| 2013/0119129 A1 | * | 5/2013 | Amdahl | G06Q 20/4014 235/382.5 |

(56) References Cited

U.S. PATENT DOCUMENTS

| | | | |
|---|---|---|---|
| 2013/0254047 A1* | 9/2013 | Mullin | G07C 9/00912 705/18 |
| 2013/0254048 A1* | 9/2013 | Mullin | G07C 9/33 705/18 |
| 2013/0254122 A1* | 9/2013 | Mullin | G06Q 30/0645 705/307 |
| 2013/0254123 A1* | 9/2013 | Mullin | G07C 9/00912 705/307 |
| 2013/0264168 A1* | 10/2013 | Usem | G07F 17/12 194/202 |
| 2013/0307382 A1* | 11/2013 | Garrison | G07F 9/001 312/215 |
| 2013/0325521 A1* | 12/2013 | Jameel | G06Q 10/02 705/5 |

* cited by examiner

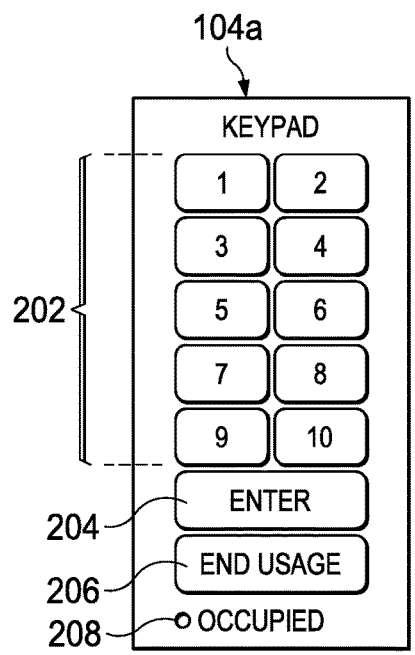
FIG. 2
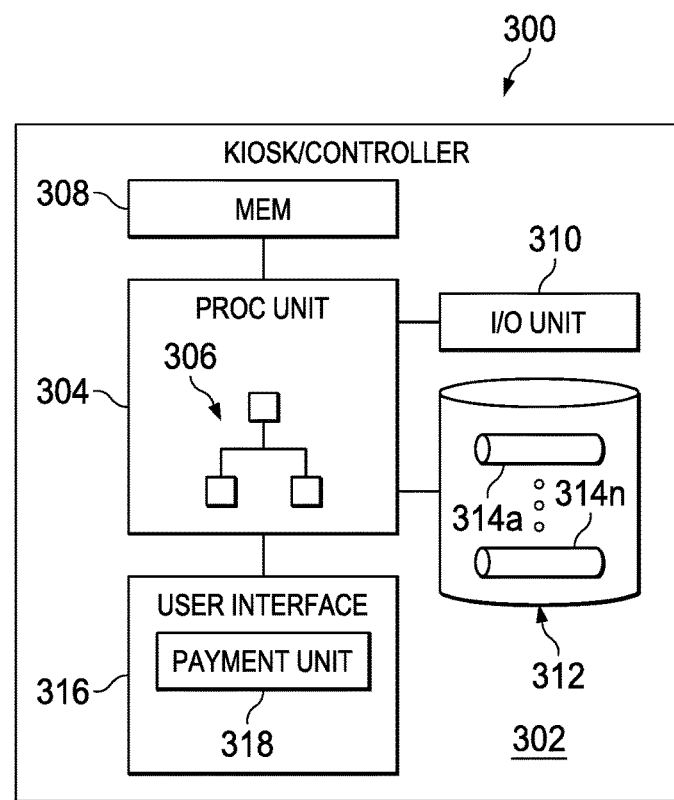
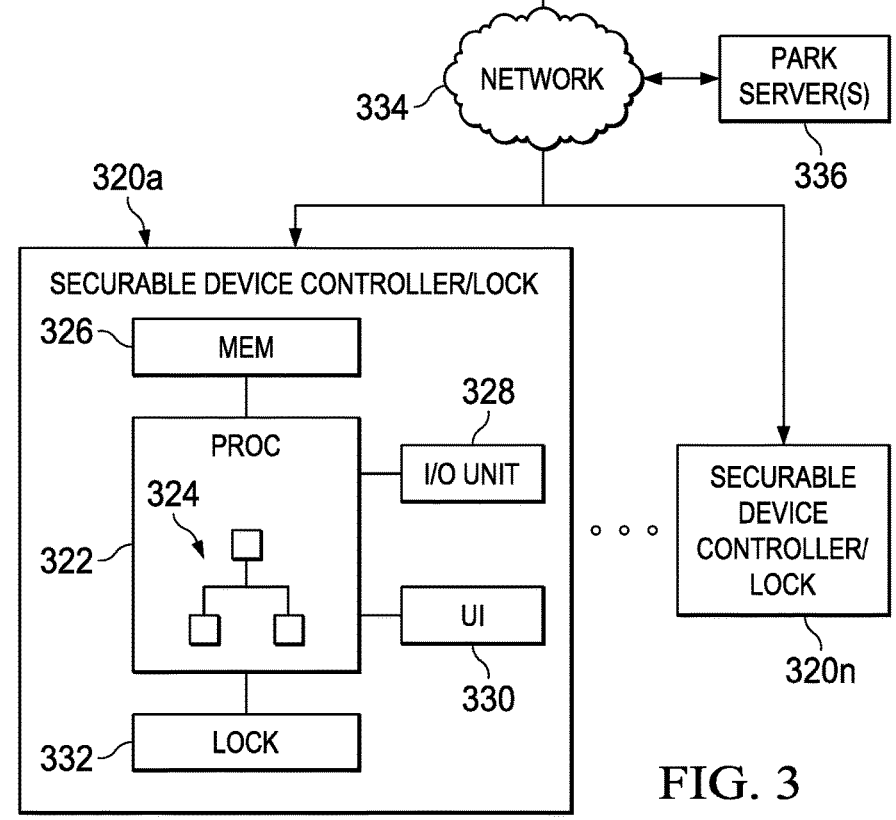
FIG. 3

400

DATA REPOSITORIES

PROVISIONED SECURABLE DEVICES  402

| SECURABLE DEVICE IDENTIFIER | ACCESS INDICIA | VALID INDICIA CONDITION(S) | USER INTERACTIONS WITH SECURABLE DEVICE |
|---|---|---|---|
| 1 | 1234 | ALL DAY | 8:37AM OPEN; 8:40AM LOCK |
| 2 | 6789 | 8:30AM-12:30PM | 8:42AM OPEN; 8:44AM LOCK |
| 3 | 9876 | ALL DAY; ALL PARKS | 8:42AM OPEN; 8:45AM LOCK |
| ○○○ | ○○○ | ○○○ | ○○○ |
| 23 | 3724 | ALL DAY | 9:42AM OPEN; 9:46AM LOCK |
| 24 | 4123 | 2:00PM-5:00PM | 2:10PM OPEN; 2:11PM LOCK |
| 25 | 5250 | ALL DAY; ALL PARKS | 10:00AM OPEN; 10:03AM LOCK |

ESTABLISHED, UNPROVISIONED RENTALS

| ACCESS INDICIA | VALID INDICIA CONDITION(S) | PURCHASE DATE/TIME |
|---|---|---|
| 5250 | ALL DAY | 7/14/12 8:45AM |
| 5057 | 2 LOCKS | 7/14/12 8:48AM |
| 6996 | 1 LOCK; LARGE LOCKER | 7/14/12 8:52AM |
| ○○○ | ○○○ | ○○○ |
|  |  |  |

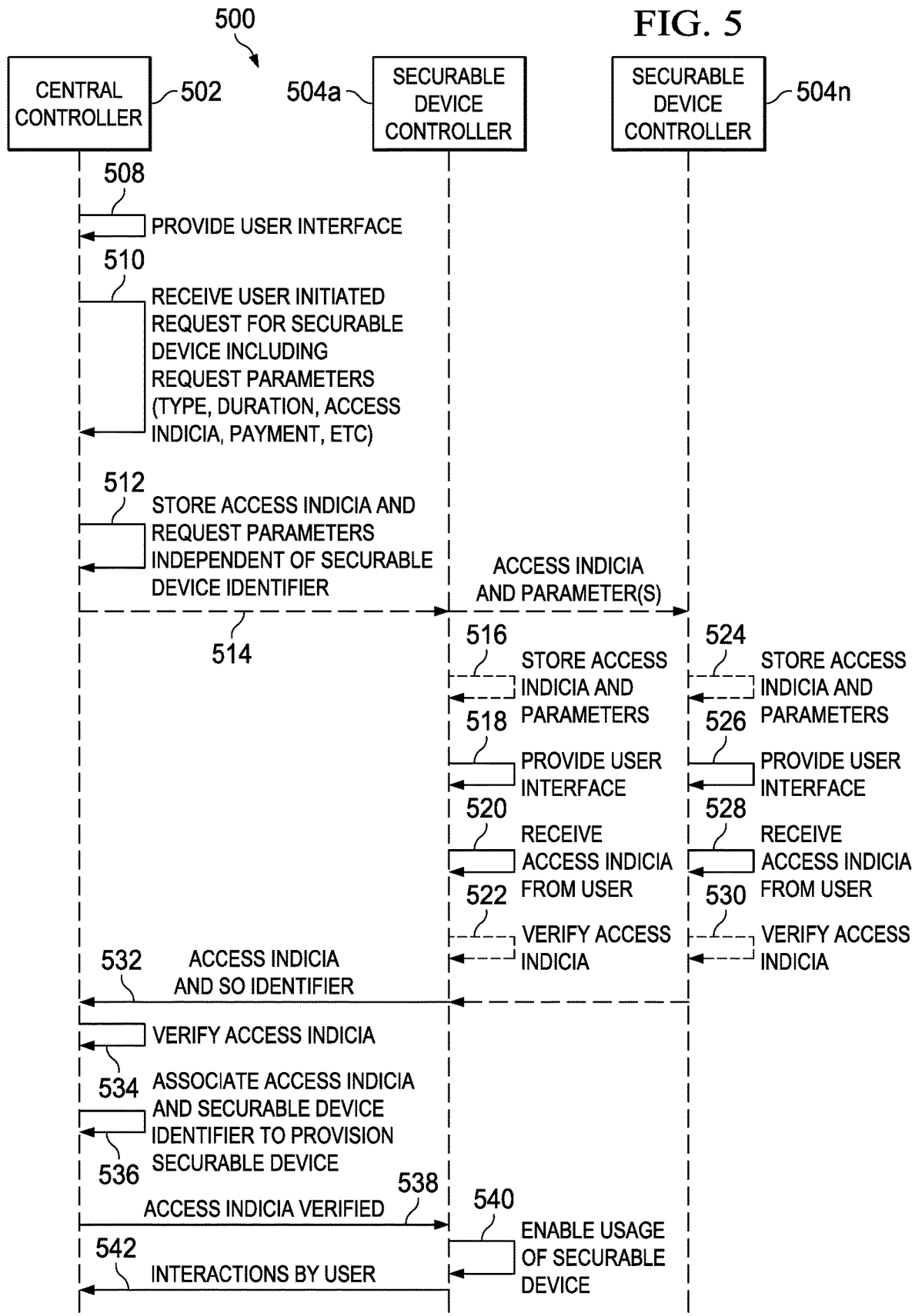

LOCKER OPTIONS 600

DURATION:
- 602 ○ SINGLE LOCK $2.00
- ○ MULTIPLE LOCKS $1.00 PER EACH LOCK AFTER FIRST
- ○ 2 HOURS $1.50
- ○ 1/2 DAY (UNTIL 2PM) $4.00
- ◉ ALL DAY $5.00

PROVISIONING:
- 604 ○ ASSIGNED LOCKER $0.00
- ◉ SELECT YOUR OWN LOCKER $0.00

LOCATIONS:
- 608 ○ THIS LOCKER BANK ONLY $0.00
- ○ THIS FACILITY ONLY $0.50
- ○ THIS PARK SECTION ONLY $1.00
- ◉ THIS PARK ONLY $2.00
- ○ ALL PARKS $4.00

LOCKER SIZE: 606
- ○ SMALL $0.00
- ◉ LARGE $1.00
- ○ RIDE ONLY $0.00

TOTAL DUE 610
$8.00

FIG. 6

PAYMENT METHOD 700

- 702a DEBIT
- 702b CREDIT
- 702c PAYPAL
- 702d CASH
- 702e PREPAID SCAN

FIG. 7

SYSTEM AND METHOD FOR ENABLING A USER TO SELECT A SECURABLE DEVICE THROUGHOUT MULTIPLE SECURABLE DEVICE STATIONS

RELATED APPLICATIONS

This Application is a continuation of a continuation of U.S. patent application Ser. No. 15/652,124 filed Jul. 17, 2017, which is a continuation U.S. patent application Ser. No. 14/165,291 filed Jan. 27, 2014 which claims priority to U.S. Provisional Application Ser. No. 61/808,523 filed Apr. 4, 2013, the contents of which are hereby incorporated by reference in their entirety.

BACKGROUND

Rental securable devices, such as lockers at amusement parks and ski slopes, were historically coin operated. A couple of problems have traditionally existed with coin operated lockers, including people not having quarters and people simply using the lockers without paying for them as a result of coin operated lockers having to be unlocked before coins are deposited and a key being removed from the locker.

More recently, for efficiency and informational purposes, banks of securable devices or locker systems rentable via a kiosk were developed. As understood in the art, these locker systems provide for one or more centrally configured kiosks to enable a user to interface with a single or multiple points to pay for and rent a securable device or locker. In renting a locker through such a conventional kiosk, a user submits a personal identification number (PIN) and the kiosk assigns a locker for the user and communicates the submitted PIN to the assigned locker, thereby enabling only that user to have access to that assigned locker. The user also sets the rental time for that locker at the kiosk.

SUMMARY

To allow for users of securable devices within an environment (e.g., amusement park) in which securable devices are located throughout the environment to have access to securable devices throughout the environment, the principles of the present invention allow a user to rent a securable device at one location and be able to move that rental to another securable device at another location. By allowing this movement or portability of rental of securable devices, the users may travel throughout the environment and have the convenience of being able to move storage of personal belongings in different securable devices without having to go through a rental process each time.

One embodiment of a method of provisioning a securable device may include providing a plurality of securable device stations, each securable device station including (i) a controller and (ii) a set of securable devices in local communication with the controller, the controller being configured to enable a user to initiate access to a securable device from a set of securable devices. In response to a first controller of a first securable device station receiving (i) an access indicia and (ii) rental parameter that enables the user to access a securable device located in at least two of the securable device stations from a user, the first controller may communicate the access indicia and rental parameter to a network address that enables, by a second controller, the user to access a securable device at the second securable device station as provided by the rental parameter.

One embodiment of a system for provisioning a securable device may include multiple securable device stations, where each securable device station may include (i) a controller and (ii) a set of securable devices in local communication with the controller. The controller may be configured to enable a user to initiate access to a securable device from a set of securable devices. A first controller of a first securable device station may be configured to (a) receive (i) an access indicia and (ii) rental parameter that enables the user to access a securable device located in at least two of said plurality of securable device stations from a user, and (b) in response to receiving the access indicia and rental parameter, communicate the access indicia and rental parameter to a network address. A second controller of a second securable device station may be configured to (i) receive the access indicia and rental parameter communicated by said first controller and (ii) enable the user to access a securable device at the second securable device station as provided by the rental parameter.

BRIEF DESCRIPTION

Illustrative embodiments of the present invention are described in detail below with reference to the attached drawing figures, which are incorporated by reference herein and wherein:

FIG. 2 is an illustration of an illustrative keypad that provides a user interface for a user to access a locker of FIG. 1;

FIG. 3 is an illustration of an illustrative network environment in which a kiosk/controller may communicate with securable device controllers/locks in accordance with the principles of the present invention;

FIG. 4 is an illustration of illustrative tables for use in provisioning securable devices and establishing undesignated rentals or access indicia for use of the securable devices;

FIG. 5 is an interactive diagram of an illustrative process that enables users to select their own securable device at the physical securable devices in accordance with the principles of the present invention;

FIG. 6 is a screenshot of an illustrative user interface provided on a kiosk that enables a user to rent a locker in accordance with the principles of the present invention;

FIG. 7 is a screenshot of an illustrative user interface that enables a user to select a payment method for renting a securable device or locker;

Figure 16:
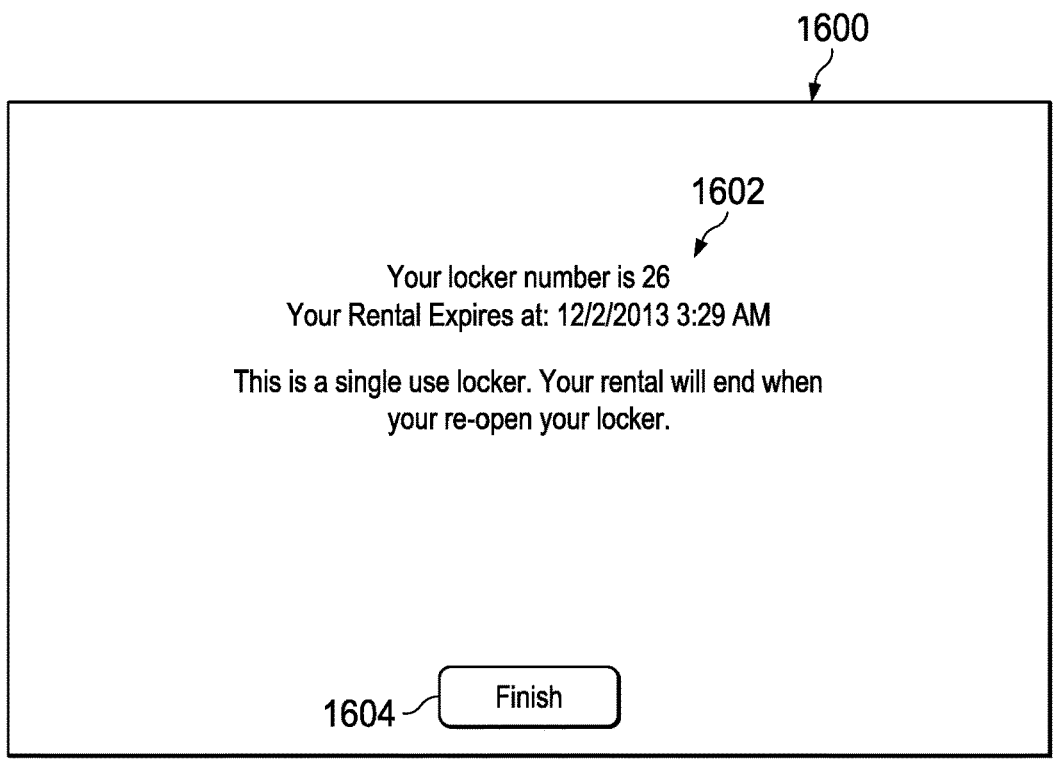
Figure 17:
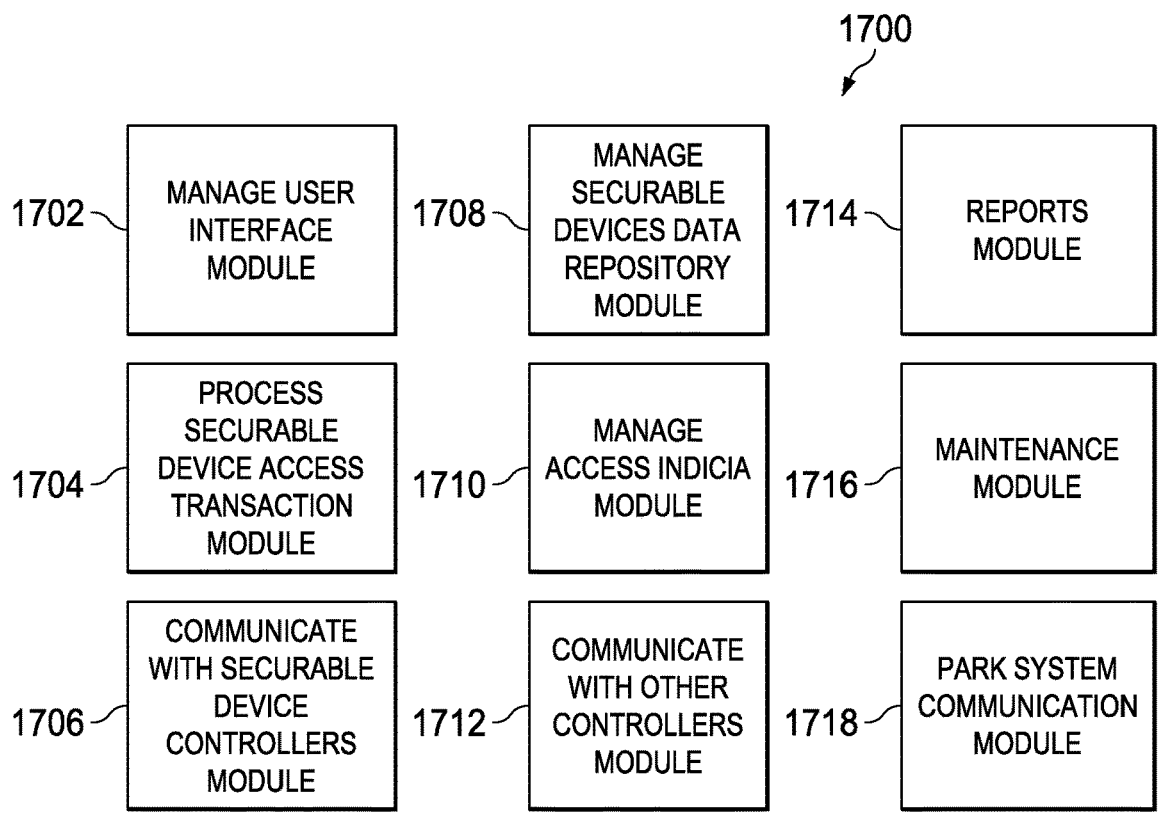

FIG. 16 is a screen shot of a graphical user interface to display a message that lists a locker number assigned to the user, rental expiration time, and selected rental type (e.g., single use locker); and FIG. 17 is a block diagram of illustrative software modules for execution on a controller or kiosk that enables a user to select his or her own locker and rent and/or select a locker within a geographic region or multiple geographic regions (e.g., different amusement parks or ski slope resorts).

DETAILED DESCRIPTION OF THE DRAWINGS

Select Your Own Locker

Figure 1:
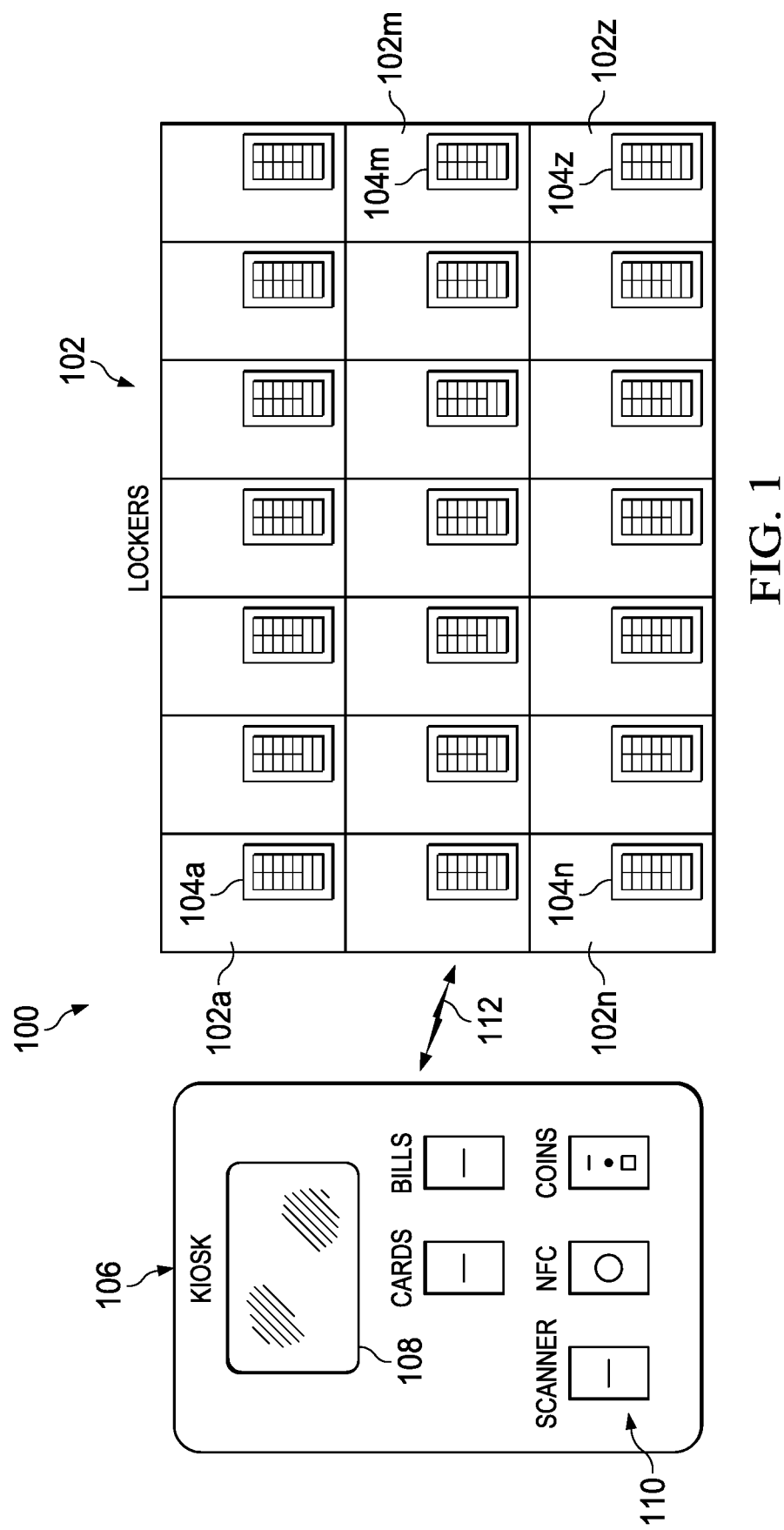
FIG. 1 is an illustration of an illustrative locker system that includes a kiosk that enables a user to pay for, access, and provision lockers in accordance with the principles of the present invention.

With regard to FIG. 1, an illustration of an illustrative locker system 100 may include a locker bank 102 in which different sized lockers 102a-102m and 102n-102z (collectively 102) are available for people to rent. It should be understood that the lockers 102 may alternatively all be the same size. Each of the lockers 102 may include locks 104a-104z (collectively 104) that are inclusive of a user interface (e.g., keypad) and electromechanical lock mechanism, as understood in the art. Associated with the locker bank 102 is a kiosk 106 with which people may use to interface in renting the lockers 102. The kiosk 106 may include a screen 108 that may display locker rental options. In one embodiment, the screen 108 is a touchscreen that enables the user to touch to make selections for renting a locker. Alternative configurations of a user interface, such as hard-buttons, may be utilized in accordance with the principles of the present invention. To make a payment for the rental of a locker, payment options 110 may provide for a renter to enter a card (e.g., credit card or debit card), pay by bills, pay by coins, use a scanner to scan a ticket, image on a mobile device, or otherwise, or pay using near field communications (NFC) via a mobile device or otherwise. Alternative payment techniques may be provided, as well. A securable device includes a locker, but is not limited to a locker as other forms of securable devices, such as ski locking mechanisms to lock skis on an outdoor ski rack at a ski slope, may be utilized in accordance with the principles of the present invention.

With regard to the scanner, the scanner may be a barcode reader, quick reference (QR) code reader, magnetic strip reader, camera, or any combination or other scanner as understood in the art to read an indicia on a ticket, mobile device, receipt, coupon, or other medium usable to provide the kiosk 106 with payment credit or instructions (e.g., season locker payment amount, daily discount, etc.). For example, in one embodiment, the user may purchase a season ticket that also includes a season locker rental. The season locker rental may be a multiple of the cost of a daily rental, such as three times the cost of a daily rental, that may provide the user with certain access throughout a season, such as one lock/unlock per day per visit, unlimited unlocks per day, and so forth. To make the purchase, the user may purchase the seasonal locker rental from the amusement park and scan a purchase code or indicia (e.g., barcode) at a kiosk of the lockers, thereby initiating the user's seasonal rental. The QR code, if purchased via a mobile app or online via a website, may be communicated to and displayable on a mobile device and can be scanned by the scanner on the kiosk. In one embodiment, the kiosk may be in communication with the park's data system, often known as a park "folio" system (i.e., data system used to monitor seasonal ticket holders), and confirm the purchase of the seasonal locker rental prior to initiating the user's seasonal locker rental. The scanner functionality and payment options may be utilized for any rental option (e.g., "select your own," "assigned locker," "portable locker," etc.) described herein.

In accordance with the principles of the present invention, the kiosk 106 may communicate with the locks 104 to notify the locks 104 that a user has selected or been assigned a particular lock or that the user has elected a "select your own locker" option that enables a user to enter his or her access indicia, such as a personal identification number (PIN), into any available locker (i.e., a lock 104a of a locker 102a) that meets a criteria, such as small locker and/or large locker, that he or she chooses, as further described herein. A communication channel 112 between the kiosk 106 and the locks 104 of the lockers 102 may be hardwired or wireless databus, and communications may include an address for a particular lock 104 or a broadcast message that is received by all of the locks 104. The communication channel 112 may support any communications protocol, as understood in the art. The communication may include access indicia (e.g., personal identification, number) and, optionally, rental parameter(s) in a distributed system configuration or be a communication back to the kiosk from a lock or securable device controller to verify valid access indicia of the system 100 is configured in a centralized system configuration, as further described herein.

With regard to FIG. 2, an illustration of keypad 104a is shown to include numeric keys 202, "enter" key 204, and "end usage" key 206. An "occupied" visual indicator 208, such as an LED, may also be associated with the keypad of the lock 104a. In one embodiment, the keys 202, 204, and 206 are hard-buttons that the user presses to interface with the kiosk 106. Alternatively, a touchscreen electronic display with soft-buttons may be utilized. Additional indicators, such as a "PIN not recognized" indicator in the form of a light and/or audio signal (not shown), may additionally and/or alternatively be provided in association with the lock 104a.

With regard to FIG. 3, an illustrative network environment in which a kiosk 302 may be utilized by a user to rent a securable device is shown. The kiosk 302 may include a processing unit 304 that executes software 306 that configures the processing unit 304 to perform certain functions in accordance with the principles of the present invention. The processing unit 304 may be in communication with a memory 308, input/output unit 310, and storage unit 312. The storage unit 312 may include one or more data repositories 314a-314m (collectively 314). The processing unit 304 may further be in communication with user interface 316 that includes a payment unit 318. The software 306 may operate in conjunction with each of the other components, including providing functionality that supports the user interface 316 to assist in renting securable devices (e.g., lockers). These data repositories 314 may include information in association with each rental and each securable device, such as interactions with each securable device by users who have rented the securable devices. The payment unit 318 may be configured to accept payment (e.g., cash, credit, debit, scanning of receipt, ticket, mobile device) for rental of securable devices. The software 306 may be configured to assign a securable device to a user, enable a user to select his or her own securable device at a bank of securable devices local (i.e., within a local proximity and/or local communication of the kiosk 302) to the kiosk 302, and/or remotely positioned from the kiosk 302 and that may be associated with another kiosk (not shown).

Multiple securable devices, such as lockers, may include a securable device controller/lock 320a-320n (collectively 320) that are in communication with the kiosk/controller 302. The securable device controller/lock 320a may be a "smart lock" and include a processor 322 that executes software 324 that is used to control operation of the securable device controller/lock 320a. The lock 320a may further include a memory 326 that is used to store data and software, input/output unit 328, user interface 330, and lock 332. The input/output unit 328 may be configured to communicate data over a network 334 with the kiosk/controller 302. The user interface 330 may be that shown in FIG. 2 or be an alternative user interface that enables a user to enter his or her PIN or access indicia (e.g., fingerprint). In such an embodiment, the controller 302 may communicate a PIN to the lock 320a via the network 334 for storage in the memory 326. In one embodiment, the software 324 may be configured to receive a PIN from the user interface 330 and compare the PIN with PINs stored in the memory 326, and, if the PIN matches one of the PINs in the memory 326, then the lock 332 may be caused to open by the processor 322. If the PIN does not match any PIN stored in the memory 326, then the software 324 may prevent the lock 332 from being opened. As a result of the securable device controller/lock 320a including a processor 322, the securable device controller/lock 320a may operate autonomously after receiving an access indicia, thereby being immune from power failure or communication failure with the kiosk/controller 302. The network 334 may be a local area network (LAN), hardwired network, wireless network, wide area network (WAN), or any other communications network, as understood in the art.

As further shown in FIG. 3, the kiosk/controller 302 may be in communication with park server(s) 336 that are configured to manage a park's data, such as season ticket holder data and point-of-sale (POS) data. The kiosk/controller 300 may be configured to receive, request, and communicate data with the park server(s) 336 to confirm locker rental purchases via a ticket booth of the park, seasonal ticket and/or locker rental purchases, online rental purchases of lockers, and so on.

With regard to FIG. 4, an illustration of illustrative data repositories 400, including a provisioned securable devices data repository 402 and an established, unprovisioned rentals data repository 404. The provisioned securable devices data repository 402 may include a number of data parameters, including securable device identifier, access indicia (e.g., PIN, RFID tag, scannable code, etc.), valid indicia condition(s), and user interactions with securable device. The access indicia may be a four digit indicia. Alternatively, other numbers of digits, such as seven, may be utilized. Still yet, the access indicia may be an alphanumeric value. Alternatively, the access indicia may be a biometric identifier (e.g., fingerprint or swipe of a user's finger), for example. The valid indicia condition(s) may include a variety of different valid conditions, such as the securable device being rented all day, over a limited period of time (e.g., 2:00 pm-5:00 pm), a limited time period starting from a locker selection time (e.g., 2 hours from locker selection) over a limited geographic area, local to a kiosk, a combination thereof, or otherwise. The conditions may be listed in a human-readable form, but machine readable information or information in other formats (e.g., all parks=p1–p4), for example. The user interactions with a securable device may include a historical listing of when an associated securable device is accessed by a user. All interactions may be captured and stored.

In accordance with the principles of the present invention, data repository 404 may be configured to store data of established, unprovisioned rentals. That is, the content stored in the data repository 404 is not yet associated or provisioned with any securable device. As shown, the data repository 404 may include a number of data parameters, including access indicia, valid indicia condition(s), and purchase date/time. The valid indicia condition(s) may include a time range (e.g., hours of accessibility, duration of accessibility from first locker access), date range, number of locks that a user can access securable devices in a certain geographic area, and time and date that the user has purchased the accessibility to any available securable device. The securable devices may also be specified based on size, such as small locker or large locker, and location, such as locker in park A, locker in any of parks A-N, locker at particular ride (e.g., rollercoaster), or otherwise.

Because the users have requested to have an undesignated or unassigned locker, the data stored in data repository 404 may be, at least in part, be communicated to securable devices that meet the criteria of the selected securable devices (e.g., time range, location, size) or utilized by the kiosk to compare when new access indicia are received from securable devices. That is, any securable device that meets rental parameter(s) and receives a valid access indicia may be provisioned or assigned with that access indicia. For example, in response to a user with access indicia "5250" entering that access indicia into a securable device controller of a securable device, the securable device controller, if the established unprovisioned rental data has been downloaded thereto, may vary of the access indicia and indicia condition(s) or communicate received access indicia to the kiosk for confirmation thereat prior to providing access to the securable device. Although not shown, a user identifier may be associated with the access indicia, thereby allowing the user to change his or her access indicia in different rental periods, and the system to track and use historical information of the user.

With regard to FIG. 5, an interaction diagram of an illustrative process 500 that enables a user or renter of a securable device to select his or her own securable device, as opposed to the kiosk assigning a securable device, is provided. A central controller 502 operating as or within a kiosk may communicate with securable device controllers 504a-504n (collectively 504). The securable device controllers 504 may be associated with respective securable devices that are local or in immediate proximity of the central controller 502 (e.g., under the same roof or conspicuously near the kiosk).

The process 500 may start at step 508, where a user interface is provided by the central controller 502. The user interface may be a graphical user interface on a touchscreen, graphical user interface with hard-buttons associated with the graphical user interface for selection of user options, hard-buttons not on a graphical user interface, or otherwise, as understood in the art. At step 510, the central controller 502 may receive a user initiated request for a securable device including request parameters. The request parameters may include type of locker, size of locker, location(s) of locker, duration of rental, access indicia, payment, etc. At step 512, the central controller 502 may store access indicia and request parameters independent of a securable device identifier (e.g., locker number or identifier). The stored access indicia and request parameters are established, unprovisioned at this point and remain unprovisioned until the user enters the access indicia into a securable device associated with one of the securable device controllers 504. Such a configuration allows for users to delay start time for rental periods. The storage may be in a data repository, such as those shown in FIG. 4.

At step 514, an optional step, as indicated by dashed lines, of communicating the access indicia and parameter(s) may be communicated to the securable device controllers 504. That is, because the user requested to use a user selection process for one of the securable devices, the indicia and parameter(s) are communicated to the securable device controllers 504 so that the securable device controllers 504 may perform their own verification of an access indicia submitted into one of the securable devices by a user. In such a decentralized verification, provisioning of a selected securable device by the central controller 502 thereafter or a centralized verification of the access indicia may be performed in addition to the decentralized verification (i.e., both the securable device controller and central controller 502 may perform a verification of an entered access indicia).

If step 514 is performed, then at step 516, the securable device controller 504a stores the access indicia and associated parameters. At step 518, a user interface may be provided to a user. In one embodiment, the user interface may be a keypad, as provided in FIG. 2, for example. Alternative user interfaces may be provided at the securable devices, as well. At step 520, the securable device controller 504a may receive an access indicia from a user who is selecting his or her own securable device at a physical securable device. At step 522, if the access indicia parameter(s) are communicated to the securable device controller 504a at step 514, then the securable device controller 504a may verify the access indicia. In verifying the access indicia, the securable device controller 504a may verify (i) that the access indicia matches an access indicia (e.g., PIN) or has a match likelihood above a threshold if using biometrics, for example, of an access indicia being stored by the controller 504a and that the parameters (e.g., date, time, time frame, location number of times of using locks, etc.) are valid. Steps 524-530 performed by securable device controller 504n may be identical to the steps 516-522 performed by securable device controller 504a.

At step 532, in the event that step 514 is not performed, where the securable device controllers 504 are provided the access indicia and parameter(s) as is performed in a distributed system configuration, the access indicia entered into a selected one of the securable device controllers 504 and associated securable device identifier are communicated back to the central controller 502 for verification thereat. At step 534, the central controller 502 may verify the access indicia 534 received from the selected securable device controller. This configuration is a centralized configuration, as opposed to a decentralized or distributed configuration where the securable device controllers 504 perform the verification step. As shown, the dashed-line steps are for the decentralized configuration. At step 536, the central controller 502 may associate or compare the access indicia and securable device identifier to established, unprovisioned rentals in an effort to provision a securable device. In other words, in response to a user entering his or her access indicia into a securable device, the central controller 502 will provision or assign the user-selected securable device to be in association with the access indicia.

At step 538, the central controller 502 may communicate an access indicia verification to the securable device controller 504a. At step 540, usage of the securable device may be enabled for the user by the securable device controller 504a by unlocking the securable device or otherwise recognizing that the securable device is being utilized by the user. If, at step 534, the access indicia is not verified, then the central controller 502 may not associate the access indicia and securable device identifier so as to not provision the securable device, and a provision rejection signal may be communicated at step 538 to the securable device controller 504a to prevent the user from accessing the associated securable device. At step 542, the securable device controller 504a may communicate any further interactions by the user with the securable device controller 504a (i.e., locking, unlocking, entered access indicia, or otherwise).

With regard to FIG. 6, a screenshot of an illustrative user interface 600 is provided. The user interface 600 may include a number of different selectable parameters, including duration of rental 602, provisioning type 604, locker size 606, and locations of lockers 608. The duration for rental section 602 may include a single lock (i.e., lock the locker one time and the rental is complete), multiple locks for additional cost, two hours fixed time of locker rental unlimited locks, half day rental with an unlimited number of locks (i.e., in-and-outs of a locker), or all day rental with an unlimited number of locks. The provisioning section allows the user (i) to have a locker assigned to him or her by the kiosk or (ii) to select their own locker, where the user may select any qualifying locker by entering his or her indicia at any locker or any type or class of lockers (e.g., small or large). The locker size selection option 606 may include a small locker for a first charge (e.g., no additional charge) or a large locker for an additional charge (e.g., $1.00 additional).

It should be understood that the locker options may include different or additional options and may vary based on park type, locker types, or any other configuration of securable devices or system configurations. As an example, the user may be able to purchase rental of ride-only lockers that are meant for small items, such as mobile devices, for no or some charge ($1.00), for multi-ride only locker usage. If all large lockers are currently provisioned, then the system may prevent such a rental or provide notice that all large lockers are currently provisioned and allow for a large locker rental and allow the user to access small lockers and large lockers when one becomes available. In one embodiment, a "family or friends rental" option may be provided, where a certain number of simultaneous rentals, such as four large lockers, using the same or different access indicia may be performed to reduce the amount of time needed at the kiosk by related people. The location section 608 allows the user to select a locker based on location of the lockers, such as a locker bank associated with the kiosk, a locker bank anywhere within a facility (e.g., ski lodge), at a particular ride (e.g., Tornado Alley coaster), at a particular park section (e.g., Fantasy Place), at a particular park (e.g., Dinosaur Park), all parks, or otherwise. A total due amount field 610 may tabulate a total amount due by the user for the selected options.

With regard to FIG. 7, a screen shot of an illustrative user interface 700 for enabling a user to select a payment method for rental of a securable device is shown. The user interface may include a number of different payment options, including debit 702*a*, credit 702*b*, Paypal® 702*c*, cash 702*d*, or prepaid scan 702*e*. It should be understood that any other form of payment may be included, such as using a near field communication (NFC) payment method via a smart phone (e.g., ewallet). In addition, the user interface may allow for promotional discounts, coupons, or other cost-offsetting discounts to be entered via scanning or text entry. Other possible payment systems may be utilized, including coins, private point-of-sale systems of amusement parks (e.g., Disney Dollars©) or ski resorts, for example, coupons, Internet or ticket booth pre-purchase codes, and so on. In one embodiment, a location in which the lockers are operating, such as an amusement park, may allow for users to purchase locker rentals while paying for passes into the location (e.g., amusement park day or multi-day pass). In such an embodiment, the park pass or entry ticket, which may include a code printed on the entry ticket or computer readable medium, such as a magnetic strip or RFID tag, on the entry ticket may include information that can be read by the kiosk, central controller, secondary controller, or securable device controller.

The human or machine readable information may enable the user to have access to a securable device, thereby allowing the system to provision a securable device for the user without having pay money in any form at a kiosk or otherwise. That is, the user simply presents or scans the ticket at the local controller (e.g., kiosk) and the system reads and confirms payment information and handles the provisioning as if the user paid at the kiosk using another form of payment. Alternative means of payment may be made, such as (i) using a hotel room key with payment information for a securable device, (ii) text messaging a payment code, (iii) entering a coupon code (e.g., 8 digit alphanumeric code), (iv) submitting a prepaid code to a text message address that, if confirmed, is communicated to a central controller to establish payment, (v) imaging or scanning an indicia, such as a bar code or QR code, and messaging or uploading that imaged indicia to an online address or locally at a kiosk, (vi) presenting a machine readable code, such as a prepaid purchase code, on a ticket or coupon to a bar code scanner or camera at the kiosk, and (vii) so on. In one embodiment, rather than scanning, the kiosk may include a text message or other communications protocol processing capability so as to receive and process an electronic message sent by a user that includes a code, indicia, or otherwise that allows the kiosk to receive, confirm, or charge for payment.

Figure 8:
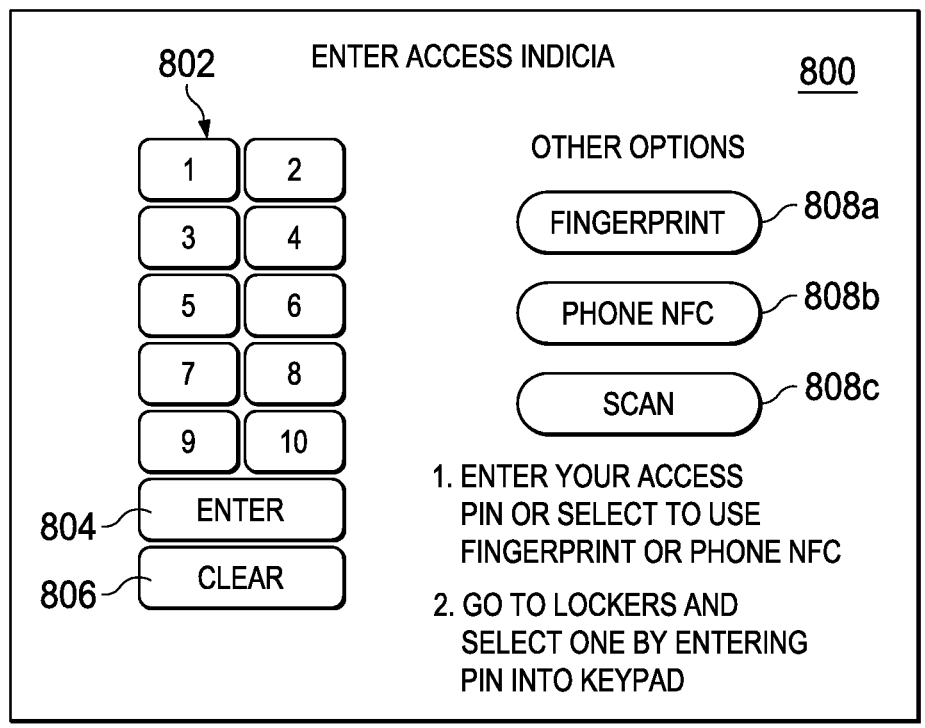
FIG. 8 is a screenshot of an illustrative user interface at a kiosk that enables a renter of a securable device to enter an access indicia (e.g., personal identification number (PIN))

With regard to FIG. 8, an illustration of an illustrative user interface 800 to enable a user to enter an access indicia, such as a PIN, that may be operated on a kiosk is shown. The user interface 800 may display a general representation of a keypad 802 that is used on securable devices. Alternative keypad representations may be utilized, such as a touch-tone telephone keypad. As shown, the keypad 802 may include, but not limited to, numeric keys 804. After the user has entered his or her access indicia, the user may select an "enter" soft-button 806. If the user makes a mistake in entering the access indicia, then the user may select the "clear" soft-button 808. It should be understood that if the securable devices include a different input device, such as a touch pad, biometric reader device, or otherwise, that the different input device may be represented in the user interface 800 or made available at the kiosk (e.g., biometric reader device) rather than the keypad. As shown, a "fingerprint" soft-button 804*a* and "phone NFC" soft-button 804*b* may be made available if either of those input devices are made available at the securable device.

Figure 9:
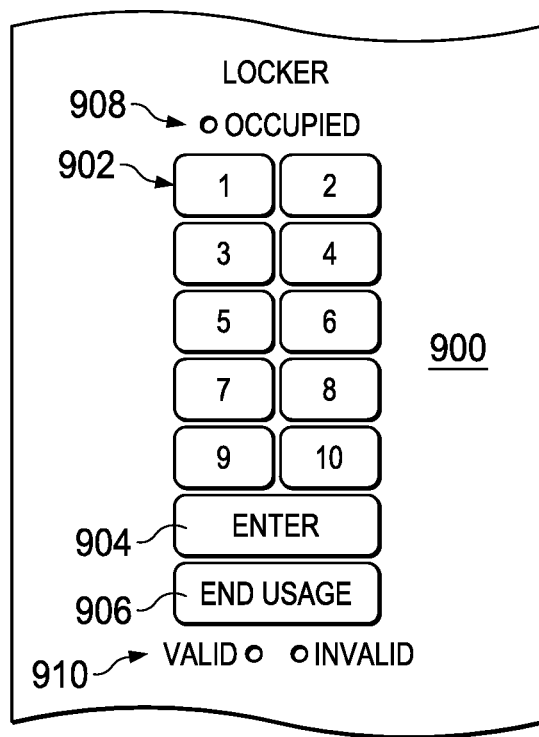
FIG. 9 is an illustration of an illustrative keypad on a locker in which the renter may use to select and access a locker by entering his or her access indicia as entered into a kiosk.

With regard to FIG. 9, an illustration of an illustrative user interface 900 of a physical securable device is shown. The user interface may include a keypad 902 that includes digits, an "enter" button 904 to submit an entered PIN, and an "end usage" button 906 when the user has completed using the securable device. Alternative configurations of the keypad 902 may be utilized, such as one that does not include an "enter" key if all PINS are required to be a certain number of digits, such as four digits. In addition to the keypad 902, the user interface 900 may also include a visual indicator 908 to show that the securable device is currently occupied and visual indicator(s) 910 to show that a PIN that is entered is valid or invalid. It should be understood that the user interface 900 may be mechanical in nature, as shown, or be displayed on an electronic display. Additionally and/or alternatively, biometric reader devices, NFC reader devices, scanners, or any other input devices that may assist in identifying a user who has rented a particular locker or any available locker through a "select your own locker" option may be utilized in accordance with the principles of the present invention. Other identification options that are possible, include, but are not limited to, barcode scanning, imaging, QR code scanning, machine readable code scanning, keyfob reading, key usage, magnetic strip card reading, Internet communication via smart phone or tablet, Near Field Communication (NFC) via smart phone or device, or any other technique.

Portable Locker

Figure 10:
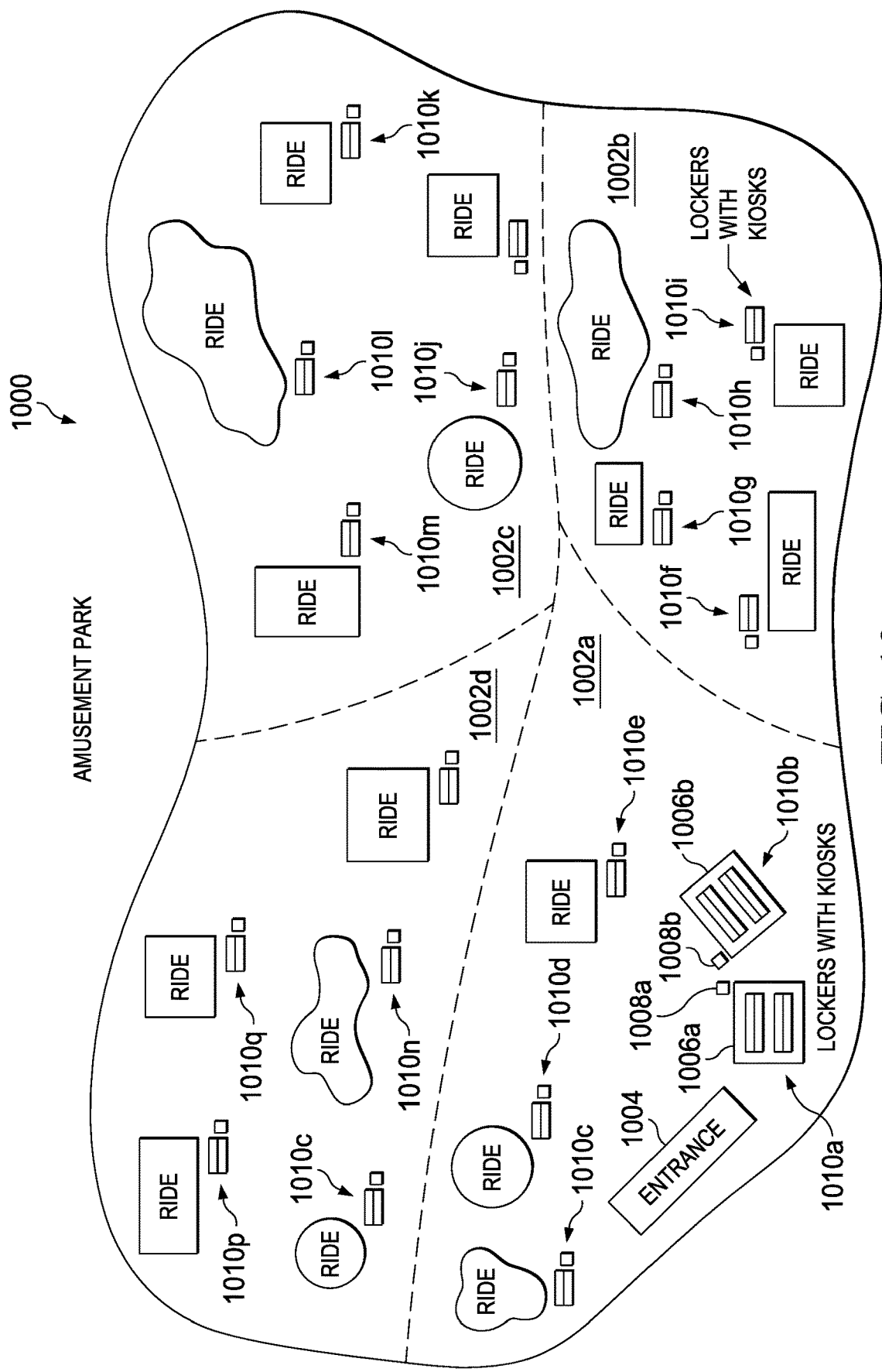
FIG. 10 is an illustration of an illustrative amusement park where users may select lockers throughout the amusement park in accordance with the principles of the present invention.
Figure 11A:
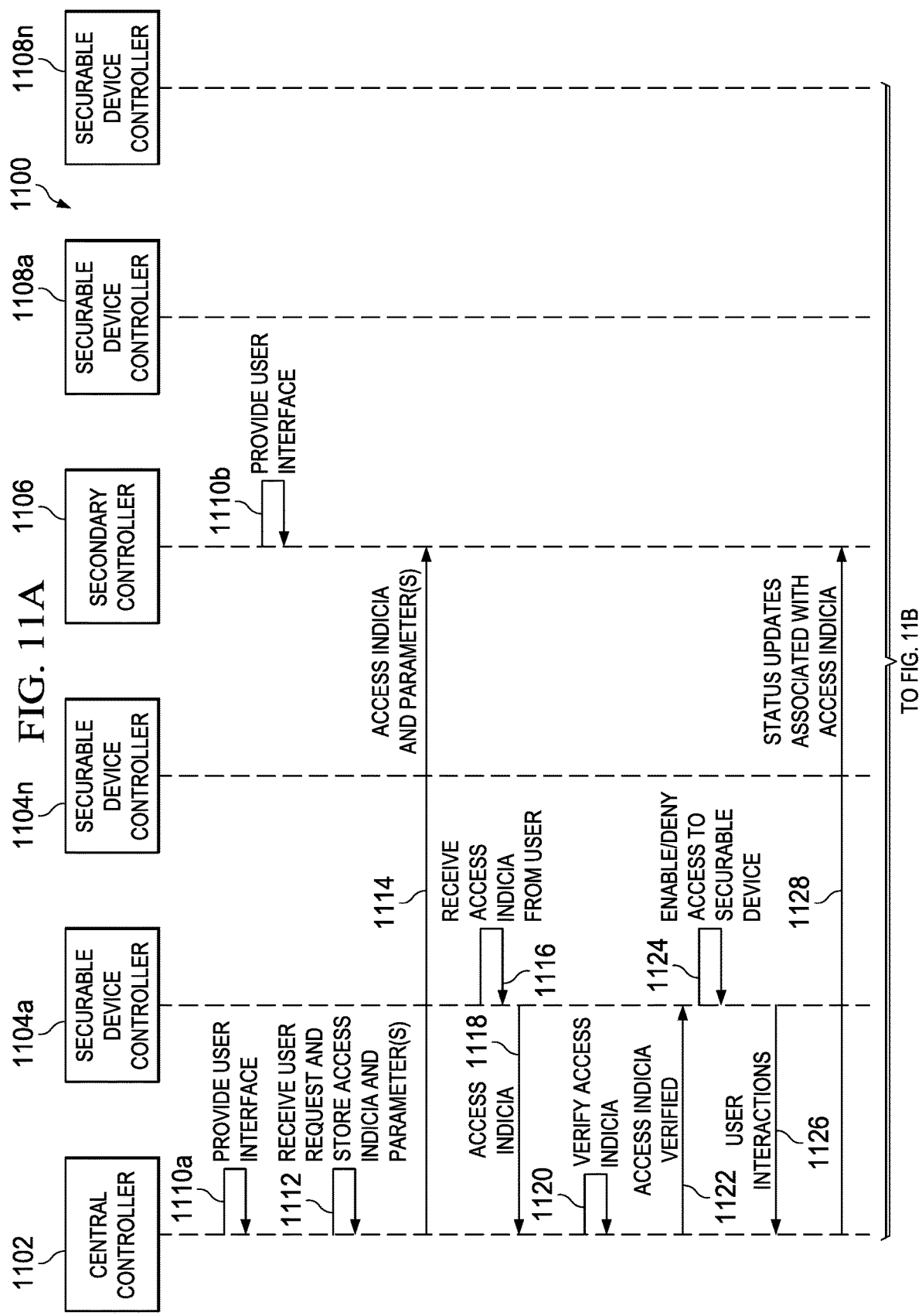
Figure 11B:
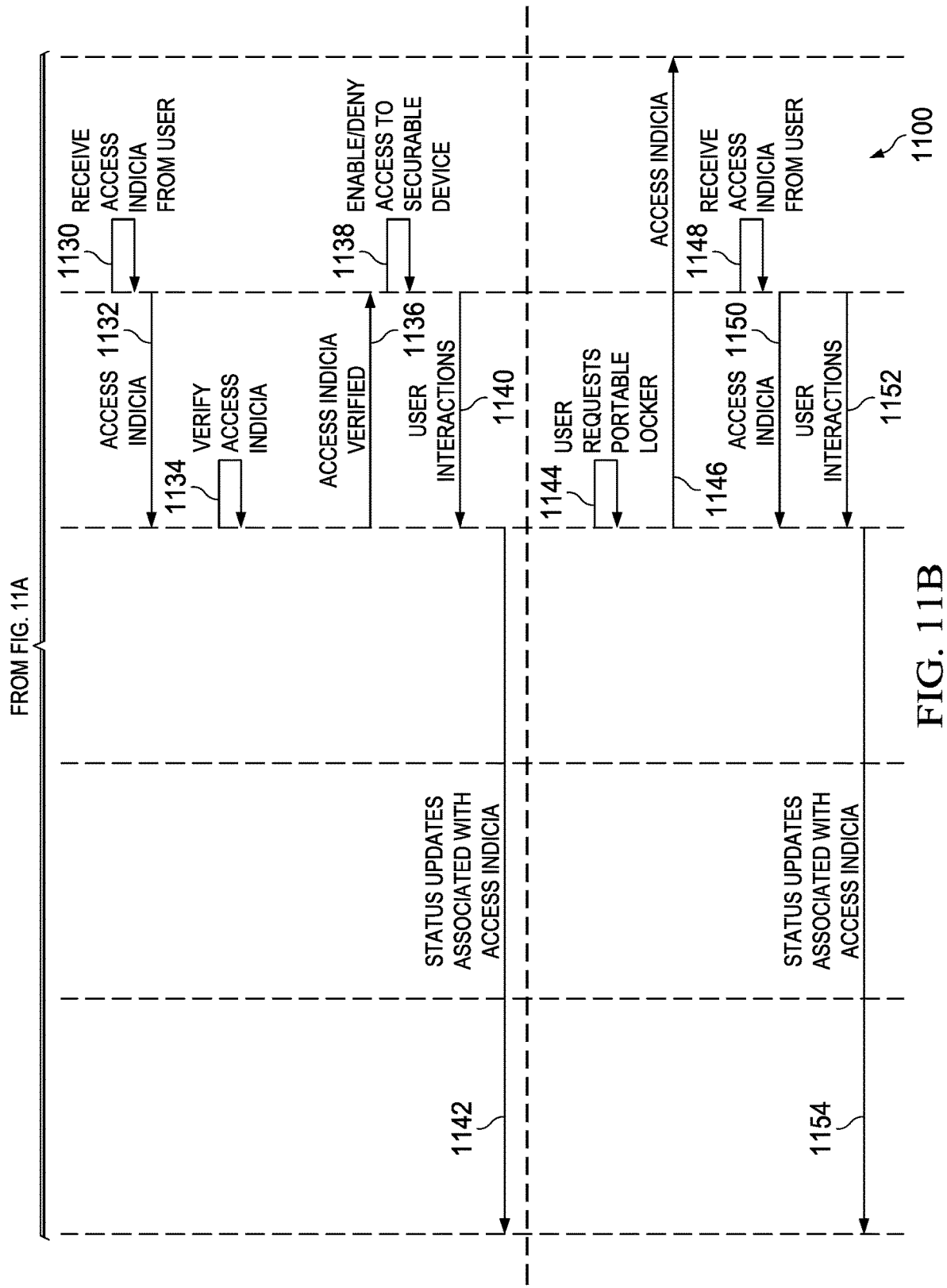

With regard to FIG. 10, an illustration of an illustrative amusement park 1000 is shown. The amusement park 1000 may include a number of different sections, including section 1002*a*, 1002*b*, 1002*c*, and 1002*d* (collectively 1002). Each of the different sections may have a different theme, as understood in the art. As people who attend amusement parks are well aware, traveling between the different sections of an amusement park can be very time consuming, especially with children. As such, people who visit amusement parks and have valuables or other items of which they wish to store, tend to store those items in lockers that are central or conveniently located near the front of the park. However, by storing items in lockers near the front of the park, to retrieve those items during the day, the user is inconvenienced. As a result, people avoid renting lockers and, thus, have to carry their valuables or other items with them, thereby reducing their enjoyment and overall satisfaction with their park experience.

Another problem that amusement parks have tried to solve over the years providing adequate and safe storage of items at rides on which people generally need to leave their valuables, such as sunglasses, wallets, prizes, mobile devices, and other items due to high speeds, inverted positions, water exposure, etc., of the rides. In some cases, those solutions are bins positioned at the ride itself. This solution, however, is insecure and many different people that are entering and exiting different cars or vehicles (e.g., boats) often have access to the items of others who are on the rides. With people carrying mobile devices, this solution is relatively unacceptable to people. As a result, an alternative, safe solution that includes a securable device is desired.

As shown in FIG. 10, the amusement park 1000 includes an entranceway 1004 through which visitors of the amusement park 1000 may enter. Two banks or sets of securable devices 1006*a* and 1006*b* (collectively 1006) are located close to the entranceway 1004. The two banks of securable devices 1006 may have kiosks 1008*a* and 1008*b* (collectively 1008) available for visitors to rent securable devices either at the entranceway 1004 or elsewhere throughout the park 1000, as further described herein. The combined banks of securable devices 1006 and kiosks 1008 are considered to be a securable device station. As previously described, the kiosks 1008 may be configured to enable a user to rent a securable device that is associated with the kiosk(s) 1008, such as any of the securable devices 1006. In such a rental, the kiosks 1008 may be configured to enable the user to have the kiosk assign one of the securable devices 1006 to the user. Alternatively, the user may enter a PIN, for example, into the kiosk and then select one of the securable devices 1006 by entering the same PIN in any of the available securable devices 1006 that conforms to rental parameters (e.g., small or large securable device). In response to the user's entering a valid PIN in one of the securable devices 1006, the selected securable device may be provisioned as being occupied by associating a securable device identifier with the PIN.

As further shown in the park, a number of different securable device stations inclusive of banks of securable devices and kiosks 1010*a*-1010*q* (collectively 1010) are available. To avoid limiting users to a locker system in which the user initially rents a securable device, the principles of the present invention may provide for a user with a rental option that enables utilization of any securable device at a particular ride (e.g., Ferris Wheel) or location (e.g., food court), in one of the sections 1002 of the park 1000, within the entire park 1000, or even within multiple parks (e.g., various related or unrelated theme parks in Orlando) over a time frame (e.g., one or multi-day time span). In providing such an option, a central controller, which may or may not be part of one of the kiosks associated with any of the securable device stations 1006 or 1010 shown in FIG. 10, may receive all rental orders and communicate access indicia and rental parameter(s) to each of the securable device controllers that meet the conditions of the rental parameter(s). Alternatively, a central controller may receive access indicia submitted at the securable devices and determine whether or not the access indicia is valid for the associated securable devices by determining whether the access indicia meets the purchased rental parameter(s), such as one that allows for selecting a locker, one for selecting a locker at a particular time of day, and one for selecting a locker in a certain section in the park 1000.

As another example, the park 1000 may have different types of securable devices, such as those that are large and located along walking paths and those that are small and located at loading points of a ride. The user may elect to purchase an option that allows for use of one or both types of securable devices. The user may also elect to purchase an option that allows for use of both types simultaneously so that the user may use a larger securable device to store larger items, while also allowing the user to use a small securable device to store smaller items, such as sunglasses, keys, mobile phone, wallet, etc., when participating on a ride. To employ these options, either a central or distributed network and controller configuration may be utilized, where a central configuration has a central system (e.g., server) receiving requests from each of the securable devices or their associated kiosks, if utilized, receive and verify access indicia and rental parameter(s), while a distributed configuration may have each of the local kiosks or securable device controllers handle verifying access indicia and rental parameter(s). In the central configuration, the access indicia and rental parameter(s) are not communicated from a central controller (e.g., kiosk) to securable device controllers, while the distributed configuration communicates the access indicia and rental parameter(s) to the securable device controllers so that the securable device controllers can operate autonomously from the central controller. A central configuration may be "cloud" based or a server may operate on a local network (e.g., at an amusement park).

Fraud detection may also be employed to prevent one person renting a securable device and providing an access indicia, such as a PIN, to others for simultaneous use at other securable devices throughout the park 1000. In a central system, such a fraud detection system would verify whether the access indicia is currently in use and deny secondary requests for simultaneous usage at different securable devices. However, for a distributed configuration, the access indicia and, optionally, rental parameter(s) would be distributed to other kiosks and/or securable device controllers, and any changes to the status of usage would be distributed to the kiosks and/or securable device controller also. Sufficient memory may be provided for each of the distributed kiosks and/or securable device controllers and used to store each of the possible access indicia and associated rental parameter(s) available for use at those securable devices.

Figure 11:
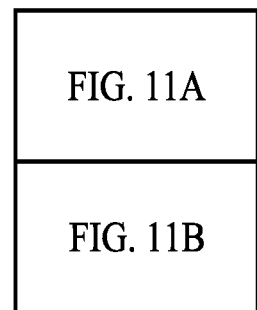
FIGS. 11A and 11B (collectively FIG. 11) is an interaction diagram of an illustrative process that enables a user to select any locker at the physical lockers themselves throughout a geographic region, such as an amusement park.

With regard to FIG. 11, an interactive diagram of an illustrative process that 1100 that enables a user to select any securable device in one or more geographic region(s) and, optionally, of a particular type, is shown. A number of different devices are shown, including a central controller 1102 (e.g., kiosk) and associated securable device controllers 1104*a*-1104*n* (collectively 1104) that are part of locks on associated banks of securable devices. A secondary controller 1106 and associated securable device controllers 1108*a*-1108*n* (collectively 1108) are also provided to enable the user to (i) select his or her own securable device, as opposed to a kiosk or central controller assigning a securable device, (ii) in either of the local or remote banks of securable devices. In this context, the local bank of securable devices is the bank of securable devices that is locally associated with the respective controllers due to proximity and configuration (e.g., hardwired and/or local bus). In this example, central controller 1102 is locally associated with securable device controllers 1104 and secondary controller is locally associated with securable device controllers 1108. Although not shown, there may be many secondary controllers locally associated with banks of securable devices each including a securable device controller. Each of the secondary controllers may operate as a kiosk that communicate with the local securable controllers to enable people to rent those local securable devices. In accordance with the principles of the present invention, each of the secondary controllers 1106 may enable a user to purchase a rental (i.e., pay for renting a securable device) that provides for the user to select a local or remotely located securable device by communicating such rental parameters in association with an access indicia along with rental parameter(s) to the central controller 1102 and/or to other secondary controllers (not shown), as further described hereinbelow.

At step 1110*a*, the central controller 1102 may provide a user interface to enable a user to rent a locker. The user interface may be the same or similar to the one shown in FIG. 6. Because the central and secondary controllers 1102 and 1106 operate independent of one another, the secondary controller 1106 may provide the same or similar interface as the one being provided by the central controller at step 1110*b*. At step 1112, a user request may be received and the central controller 1102 may store an access indicia and rental parameter(s). At step 1114, the access indicia and rental parameter(s) may be communicated to the secondary controller 1106 via a communications network. The access indicia may operate as a key for the secondary controller to use to determine whether the user is attempting to access one of the securable devices associated with the securable device controllers 1108 at some point in the future. In one embodiment, the communication of the access indicia and rental parameter(s) may be performed in response to the user making the purchase. Alternatively, since the user cannot travel between the central controller 1102 and secondary controller 1106 very quickly, the central controller may communicate such requests periodically (e.g., every 5 minutes) or aperiodically (e.g., responsive to the secondary making a request for an update in response to not recognizing an access indicia entered into one of the securable device controllers 1108).

At step 1116, the securable device controller 1104a may receive an access indicia, such as a PIN typed into a keypad, from a user. In a centralized configuration, the access indicia may be communicated at step 1118 to the central controller 1102 for verification at step 1120. The verification may determine that the access indicia matches a stored access indicia along with verifying that other rental parameter(s) are satisfied (e.g., with a number of locks, within a rental time period purchased, within a rental date period purchased, within a size of securable device purchased, for a duration of time starting from a first use, or any other rental parameter). As previously described, if a distributed configuration is utilized, where the securable device controller 1104a is capable of verifying that the access indicia is valid (i.e., step 1120 may be performed solely by the securable device controller 1104a rather than central controller 1102), a situation of a power failure disabling usage of the securable devices as a battery backup may be used by the securable device controllers 1104 and 1108 may be avoided.

Continuing with the centralized configuration, at step 1122, an access verification indicator (e.g., Boolean value) may be communicated back to the securable device controller 1104 from the central controller 1102 to indicate that the access indicia is valid or invalid. At step 1124, in response to the access verification indicator being received, the securable device controller 1124 may enable or deny access to the securable device to the user. A status indicator illumination device or audible sound may be generated, as well, to alert the user to the success or failure of the attempt to access the securable device. At step 1126, the current and further user interactions (e.g., unlocking, opening, closing, ending usage, etc.) with the securable device may be communicated by the securable device controller 1104a to the central controller 1102 so that the central controller 1102 may maintain a record of the interactions, handle provisioning operations, manage and prevent fraudulent usage, and so forth.

At step 1128, status updates associated with the access indicia may be communicated to the secondary controller 1106 so that the secondary controller 1106 may operate independent of the central controller 1102. As an example, if the access indicia has been used to access a securable device accessed via the securable device controller 1104a, then the same access indicia cannot be used to simultaneously access any of the securable devices that are access controlled by the securable device controllers 1108 while the securable device associated with the securable device controller 1104a is being used by the user using the access indicia (assuming the user has purchased a rental that includes remotely located securable devices from the central controller 1102).

At step 1130, the securable device controller 1108a may receive an access indicia from the user. In the centralized configuration, the secondary controller 1106 is central to the securable device controllers 1108 and independent from the central controller 1102, the access indicia may be communicated from the securable device controller to the secondary controller 1106 at step 1132. The secondary controller 1106 may verify the access indicia and, in response, communicate an access indicia indicator at step 1136 back to the securable device controller 1108a. The securable device controller 1108a, may, in response to receiving the indicator, enable or deny access to the user to the securable device at step 1138. At step 1140, the securable device controller 1108a may communicate the current and future user interactions with the securable device to the secondary controller 1106 to manage, provision, and prevent fraud. In response, the status updates 1142 may be communicated back to the central controller 1102 for management and redistribution purposes to other secondary controllers 1106. In an alternative configuration, the secondary controller 1106 may communicate the status updates directly with other secondary controllers and/or securable device controllers. The status updates may be performed real-time, on a period basis, or on an aperiodic basis. As with the securable device controllers 1104, the securable device controllers 1108 may operate in a distributed configuration such that the controllers 1108 may perform verifications of access indicia entered by users independent of secondary controller 1106.

Although presented with regard to FIG. 11 that the central controller 1102 may collect and manage information from the secondary controller 1106 and other secondary controllers, the principles of the present invention may alternatively utilize a "cloud" database (e.g., one accessible on a LAN or WAN, such as the Internet) that is common to each of the controllers 1102 and 1106, such that the same or similar management functionality described with respect to the central controller 1102 is positioned on the "cloud" database. Such a "cloud" solution reduces the chances of a communications failure in the event the central controller 1102 breaks or loses power as a "cloud" solution may also provide for redundancy. In addition, accounting, management, and reporting features may be more easily performed and accessible as lower operation resources of a "cloud" server are used as compared to the user-facing controllers 1102 and 1106. Other collection, reporting, and management configurations, such as all of the controllers sharing authorization and/or provisioning information with one another, that provide for the same or similar functionality of enabling a user to select his or her own securable device or have a "portable" securable device that is selectable from among any of the securable locker banks may be utilized.

Furthermore, and as detailed above, users may have the option of a single use or "portable" securable device, such as a locker, rental, where a single use rental may enable a user to select one securable device from all of the securable devices in the independent banks of securable devices in an amusement park, for example. With a "portable" securable device rental, a user may change securable devices during a given time period as desired because each independent secondary controller 1106 has the rental parameter(s) that provide for an "all park," "valid park sections," "multi-park" rental parameter associated with the access indicia. With such a configuration, when the user has completed using a securable device, the user may press an "end rental" button and a report to a controller 1102 or 1106 is performed to de-provision the access indicia from the associated securable device (e.g., 1104a or 1108a). If the user forgets to press the "end rental" button, the system (e.g., secondary kiosk) may notify the user that the previous securable device is still being rented and ask whether the user wants to end that rental, as further described hereinbelow. Once de-provisioned, if the access indicia still has available time for usage with another securable device as specified by the associated rental parameter(s), then the access indicia and associated rental parameters(s) may be placed back into or otherwise identified as being available for usage by one or more of the controllers 1102 and 1106 (or "cloud" database). Alternatively, each securable device may be configured with a sensor, optical or otherwise, that automatically determines that the securable device is empty and currently unlocked or empty and unlocked for a predetermined period of time and automatically de-provisions the securable device. In one configuration, each user may select a PIN code, such as a 4-digit PIN code. Alternatively and/or additionally, each user may have a user identifier, such as a 7-digit user identifier. Other configurations are possible, as well. For example, a non-kiosk system may be provided where apps or an Internet available website on mobile devices are utilized to interact with a "cloud" database or directly with addressable controllers (e.g., controllers that control a bank of securable devices or securable device controllers).

Continuing with FIG. 11, in an alternative embodiment, the secondary controller 1106 may operate as a "first stop" for a user in accessing a "portable" securable device at a remote securable device station, in this case including secondary controller 1106 and securable devices associated with the securable device controllers 1108, from the central controller 1102. In this configuration, the user engages the secondary controller 1106 prior to any of the securable device controllers 1108. At the secondary controller 1106, the user requests a portable locker at step 1144 by selecting to move his or her portable locker to that securable device station via a user interface of the secondary controller 1106. If the secondary controller 1106 has already received an access code of the user from the central controller 1102, then the user may gain access to a securable device associated with the secondary controller 1106 without having to re-create and/or re-rent a securable device via the secondary controller 1106. In response to the secondary controller 1106 receiving the access indicia from the user, the secondary controller 1106 may verify the access indicia and ensure that the user is complying with the parameters of his or her rental (e.g., within a purchase time limit).

If the secondary controller 1106 determines that the user has purchased a portable securable device that is available at that securable device station, then the access indicia may be communicated to each of the securable device controllers 1108 to enable the user to select his or her own securable device, as previously described. Alternatively, the secondary controller 1106 may be configured to assign a securable device for the user and communicate the access indicia to the selected securable device. At step 1148, the securable device controller 1108a may receive an access indicia from the user, and, in response, (i) determine that the user has access to that securable device and (ii) enable the user to access the securable device by unlocking a lock of the securable device. At step 1150, the securable device controller 1108a may communicate the access indicia to the secondary controller 1106, thereby notifying the secondary controller 1106 that the user has accessed the securable device controller 1108. It should be understood that the access indicia received by the securable device controller 1108a may be communicated to the secondary controller 1106 at step 1150, as well. The secondary controller 1106 may store information associated with the user accessing the securable device controller 1108a in a local repository and/or communicate that information remotely to the central controller 1102 or elsewhere (e.g., "cloud" server).

As the user further interacts with the securable device controller 1108a, those user interactions may be reported by the securable device controller 1108a to the secondary controller 1106 at step 1152. The secondary controller 1106 may communicate status updates associated with the accessing the securable device to the central controller 1102 at step 1154. Alternatively, the status updates may be communicated to another computing system, such as a "cloud" server. It should be understood that a variety of different configurations may be utilized in which the secondary controller 1106 may operate as a "first stop" for users in accessing the securable devices associated with the. securable device controllers 1108.

Figure 12:
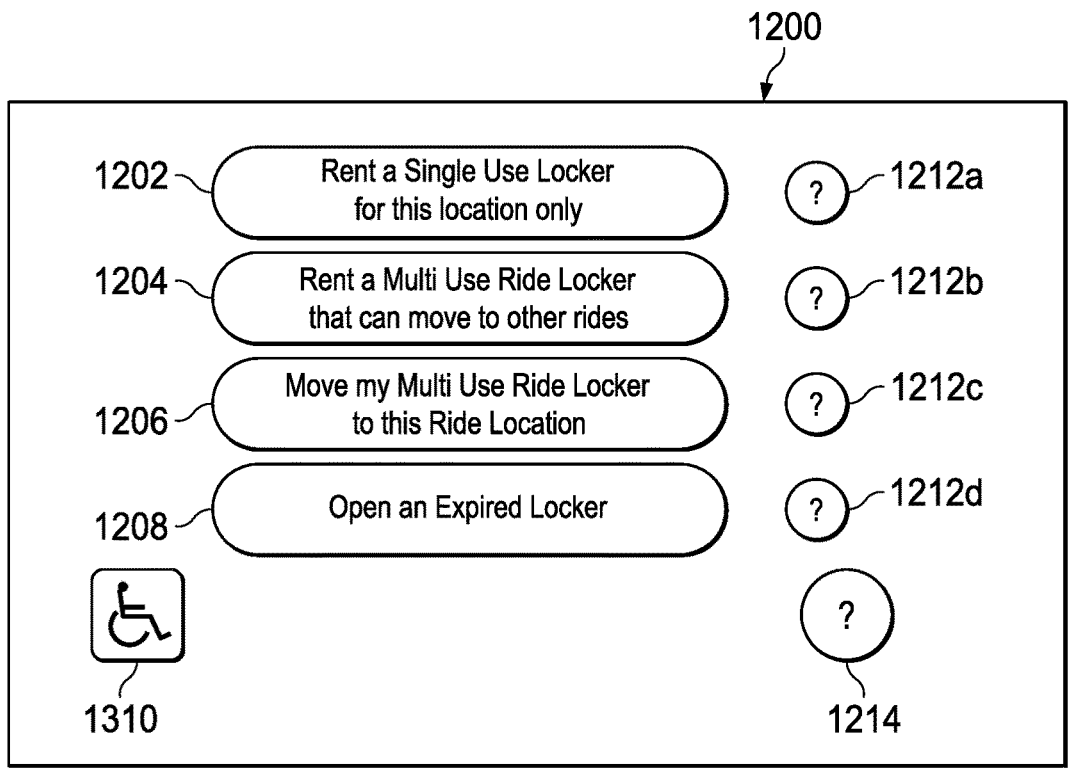
FIG. 12 is a screenshot of an illustrative graphical user interface that may be used as an initial user rental screen at a kiosk or controller at a securable device station.

With regard to FIG. 12, a screenshot of an illustrative graphical user interface 1200 that may be used as an initial user rental screen at a kiosk or controller at a securable device station is shown. The graphical user interface 1200 may provide for a number of options for a user, including soft-button 1202 that allows a user to rent a single use locker or securable device at a local securable device station, soft-button 1204 that allows the user to rent a multi-use ride locker, in the case of the kiosk operating in an amusement park or water park, for example, that can move to other locker or securable device stations, soft-button 1206 that allows the user to move his or her multi-use ride locker to this securable device station from a currently different securable device station, and soft-button 1208 that allows a user to open an expired locker or securable device. If the user selects soft-button 1208 to open an expired locker, then the user may be required to add additional money for excess time beyond the expiration time that the user has used the securable device. It should be understood that the number of selectable options and specific functions of the options may vary based on an environment in which the securable device station(s) are located. For example, if the securable device station(s) are located at a ski slope, those options may be associated with mountains, lodges, top/bottom of mountain, and so forth.

In addition to the four available selection options, the graphical user interface 1200 may provide a handicapped soft-button 1210 that alerts the kiosk or controller that the user is handicapped and to accommodate the user in making available a securable device that is handicap configured. If the kiosk is configured to select a securable device for users, or at least handicapped users, then the kiosk may select a handicap-configured securable device. If the user is able to select his or her own securable device at the kiosk, then the securable device controllers of handicap-configured securable devices may be configured to allow the user to have access thereto by sending an access indicia of the user, for example.

Figure 13:
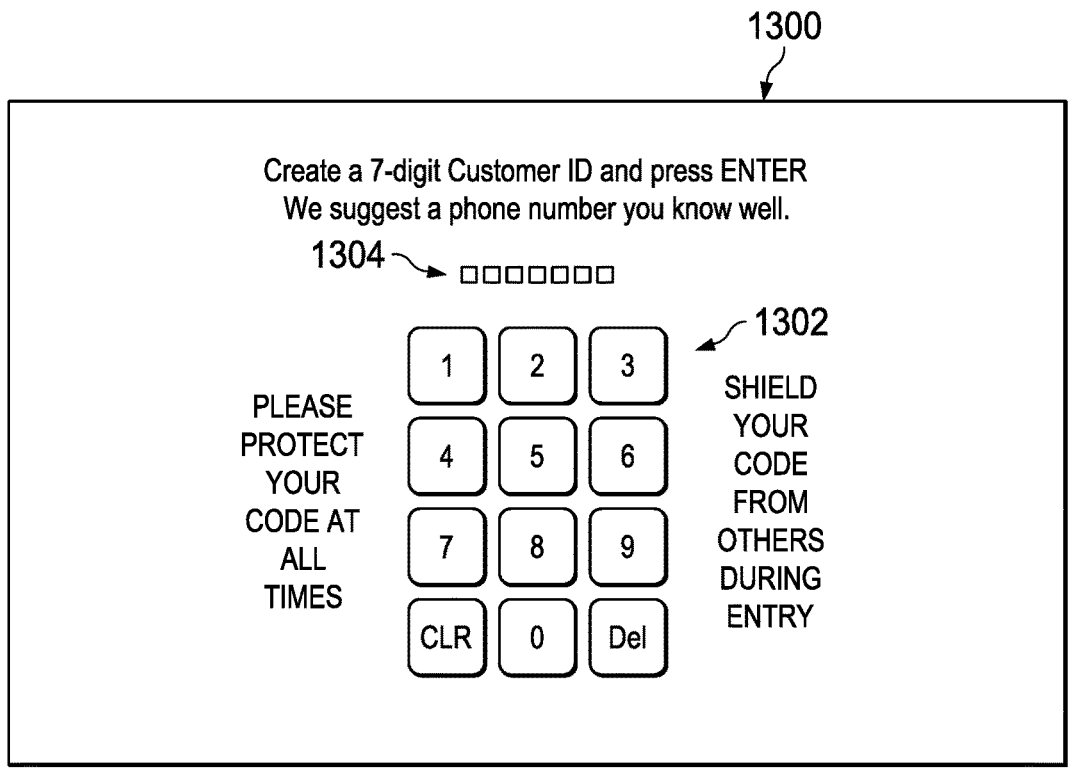
FIG. 13 is a screen shot of an illustrative graphical user interface that allows a user to enter a 7-digit customer ID into a kiosk for renting securable devices.

In addition to the functionality available on the graphical user interface 1200, help soft-buttons 1212a-1212d associated with soft-buttons 1202-1208, respectively, may enable a user to receive additional information about each of the functions of the soft-buttons 1202-1208. An overall help soft-button 1214 may be provided to enable a user to receive instructions and information of how to use the system, kiosk, and securable devices at the securable device station and environment at which the station(s) are located (e.g., amusement park). With regard to FIG. 13, a screen shot of an illustrative graphical user interface 1300 that allows a user to enter a 7-digit customer ID into a kiosk for renting securable devices is shown. The graphical user interface 1300 provides a soft-keypad 1302 and text field(s) 1304. A user of the kiosk may type in a 7-digit customer ID, such as a telephone number, and the 7-digit customer ID may be displayed in the text field(s) 1304 so that the user can review prior to submission. The kiosk or other management system may use the 7-digit customer ID to verify the user and to manage the user's usage of securable devices. It should be understood that alternative number of digits may be utilized, but that a 7-digit customer ID allows for a user to use a telephone number of which he or she can easily remember.

Figure 14:
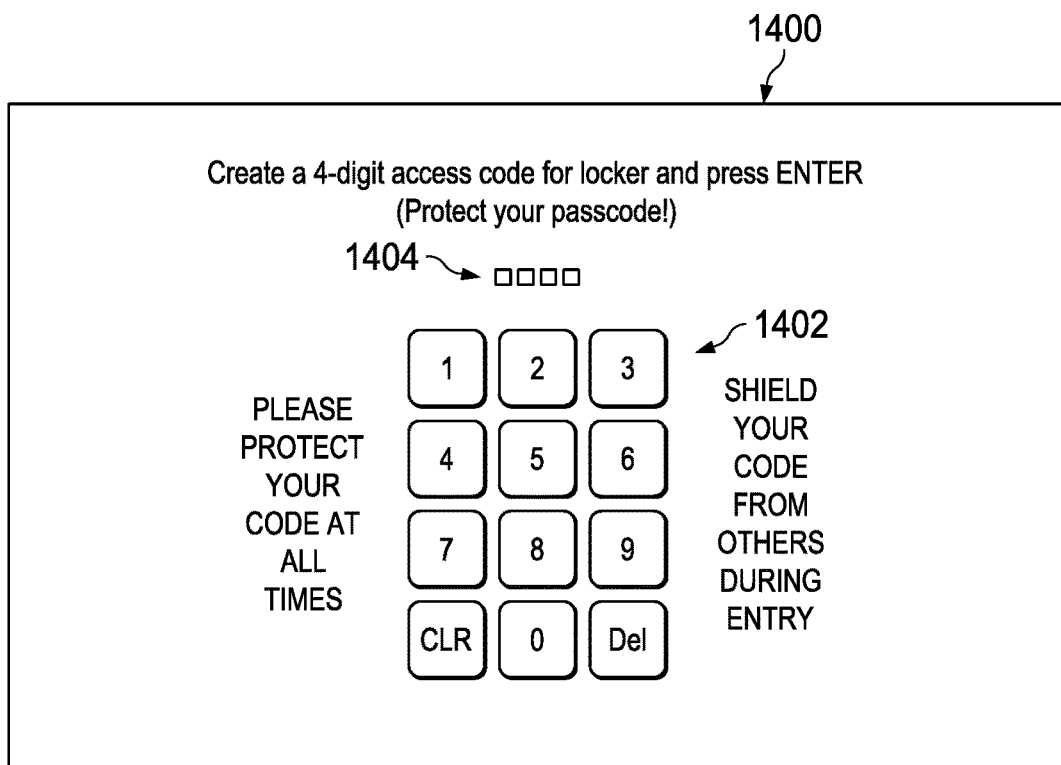
FIG. 14 is a screen shot of an illustrative graphical user interface that allows a user to enter a 4-digit access code or indicia into a kiosk for renting securable devices.

With regard to FIG. 14, a screen shot of an illustrative graphical user interface 1400 that allows a user to enter a 4-digit access code or indicia into a kiosk for renting securable devices is shown. A soft-keypad 1402 for a user to type the 4-digit access indicia or PIN, and text field(s) 1404 to allow the user to view the access indicia may be shown on the screen. It should be understood that any other number of digits may be used for the access indicia. Moreover, the access indicia may be a biometric indicia, such as a fingerprint via a fingerprint reader at the kiosk and that can also be read at the securable devices (e.g., one or more fingerprint reader for a bank of securable devices or one fingerprint reader for each securable device). The access indicia allows for the system to verify the user and securable device code.

Figure 15:
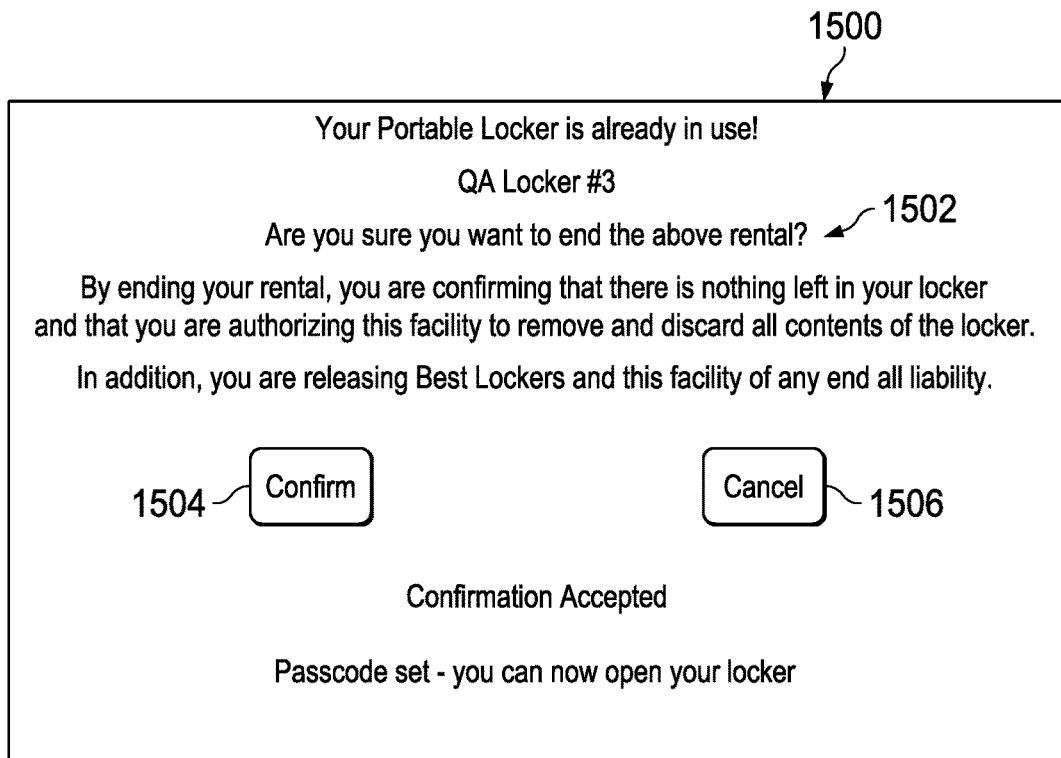
FIG. 15 is a screen shot of a graphical user interface to confirm with a user attempting to switch portable securable devices whether or not to end a currently rented securable device.

With regard to FIG. 15, a screen shot of a graphical user interface 1500 to confirm with a user attempting to switch portable securable devices whether or not to end a currently rented securable device is shown. If, for example, the user forgets that he or she still has another securable device located at the same or another securable device station still in use, then the kiosk may notify the user by displaying a message 1502, such as "Are you sure you want to end the above rental?" and display an identifier of the current securable device (e.g., "QA Locker #3") being rented. If the user does want to end the current rental, then the user may press a "confirm" soft-button 1504. Otherwise, if the user does not want to end the current rental, then the user may press a "cancel" soft-button 1506. If the user ends the existing rental, the associated controller and/or central controller may de-provision the securable device to unlock to enable other users to rent that securable device.

With regard to FIG. 16, a screen shot of a graphical user interface 1600 to display a message 1602 that lists a locker number assigned to the user, rental expiration time, and selected rental type (e.g., single use locker) is shown. Other information may additionally and/or alternatively be displayed. Once complete, the user may press a "finish" soft-button 1604. In one embodiment, the kiosk may be configured to enable a user to submit an electronic address (e.g., mobile device telephone number) that allows the kiosk to communicate a message inclusive of locker number, expiration time, or other information that might be helpful to the user in using the securable device system.

With regard to FIG. 17, a block diagram of an illustrative set of software modules 1700 that may be executed on a central controller, secondary controllers, common "cloud" database, and/or securable device controllers is shown. The software modules 1700 may include a manage user interface module 1702 that operates to manage a user interface, such as one shown in FIG. 6, to enable users to rent securable devices. A process securable device access transaction module 1704 may be configured to receive access requests from securable devices. The access requests may be in the form of access indicia being entered into user interfaces on securable devices. The module 1704 may receive the access indicia and determine whether the access indicia is valid or invalid based on rental parameter(s) and provide an indicator to a requesting securable device controller. In one embodiment, the verification process may be performed on a securable device controller.

A communicate with securable device controllers module 1706 may be configured to enable a central and/or secondary controller to communicate with securable device controllers. The communications may be performed over a communications link, such as a local area network, wide area network, or other communications network using any communications protocol, as understood in the art.

A manage securable devices data repository module 1708 may be configured to manage data associated with securable devices. The data may include a variety of different information, such as size, location, status (e.g., vacant or not vacant, locked or unlocked), usage/access information, or any other information.

A manage access indicia module 1710 may be configured to manage access indicia, including actual indicia (e.g., PIN, biometric data), date and time of purchase, rental parameter(s) (e.g., number of times to use locks purchased, duration of time purchased, dates purchased, geographic locations (e.g., at particular ride, sections of parks, multiple parks, etc.) purchased, assigned or selectable, or any other rental parameter).

A communicate with other controllers module 1712 may be configured to enable a central and/or secondary controller to communicate with other controllers. The module 1712 may be configured to communicate status updates, access requests, new access indicia and associated rental parameter(s), and so on.

A reports module 1714 may be configured to enable a supervisor of the securable device system to generate reports, including current or historical reports, usage reports, repeat user reports, or any other reports that help a supervisor manage and operate the securable device system.

A maintenance module 1716 may be configured to assist a supervisor to maintain the securable device system, including locking or unlocking specific securable devices, disabling securable devices, operation built-in-self tests of securable devices and controllers, testing communication (i) between central and secondary controllers and (ii) between central and secondary controllers with securable device controllers, examine and edit data repositories, or any other maintenance function in accordance with the principles of the present invention.

A park system communication module 1718 may be configured to interface with a park computing system that manages data, such as a park's point-of-sale (POS) system. As previously provided, the park system communication module 1718 may be in communication with a park's folio data system that manages season ticket holders who might purchase seasonal locker rentals.

The previous description is of a preferred embodiment for implementing the invention, and the scope of the invention should not necessarily be limited by this description. The scope of the present invention is instead defined by the following claims.

What is claimed:

1. A method of provisioning a securable device, said method comprising:
providing a plurality of securable device stations, each securable device station including a set of securable devices in communication with a controller, the controller being configured to enable a user to rent a securable device from a set of securable devices;
receiving, by the controller from a mobile device of the user, a request to rent a securable device, the request including an identifier of the securable device, a personal identification number (PIN) submitted by the user, payment information, and one or more rental parameters associated with the securable device;
storing, by the controller, the PIN independent of any particular securable device identifier associated with the set of securable devices;
in response to receiving (i) the PIN associated with the securable device and (ii) the identifier of the securable device, determining, by the controller, which securable devices satisfy the one or more rental parameters and are available or not available for rental and verifying that the received PIN matches the stored PIN;
in response to determining that the securable device is available for rental responsive to receiving the request to rent the securable device, prompting, by the controller, the mobile device to present to the user a first option and a second option:
the first option comprising allowing the controller to assign one of the determined securable devices to the user, and
the second option comprising allowing the user to select one of the determined securable devices,
receiving, by the controller from the mobile device, a selection of either the first option or the second option,
wherein, upon receiving a selection of the first option, the controller assigns one of the determined securable devices to the user,
wherein, upon receiving a selection of the second option, the controller:
prompts the mobile device to select one of the determined securable devices, and
receives, from the mobile device, a selection of one of the determined securable devices; and
in response to verifying that the received PIN matches the stored PIN:
associating, by the controller, the securable device identifier and the PIN so as to provision the assigned or selected securable device for the user;
communicating a verification signal indicative of the received PIN matching the stored PIN to the controller; and
provisioning, by the controller, the assigned or selected securable device for the user to access; and
enabling, by the controller, the user to access the assigned or selected securable device, otherwise, in response to determining that the securable device is not available for rental, preventing, by the controller, the user to have access to the securable device.

2. The method according to claim 1, wherein receiving the request by the controller includes receiving the request by a central controller.

3. The method according to claim 1,
wherein enabling the user to access the securable device includes communicating the PIN to a securable device controller;
wherein enabling the user to access the securable device includes enabling the user to enter the PIN into a user interface of a securable device controller of the securable device; and in response to the securable device controller determining that the PIN matches a PIN stored on the securable device controller, unlocking, by the controller, the securable device for the user to access, otherwise, preventing the securable device to be unlocked.

4. The method according to claim 1, wherein provisioning the securable device for the user to access further includes storing information associated with the user including the PIN in association with the user.

5. The method according to claim 1, further comprising communicating, by the controller, the PIN to a securable device controller to enable the securable device to be accessed in response to the PIN being received by the securable device controller.

6. The method according to claim 1,
wherein enabling the user to access the securable device further includes, in response to the user entering the PIN into a securable device controller of the securable device, verifying, by the controller, that the PIN entered into the securable device matches the PIN received by the controller from the mobile device; and
in response to verifying that the PIN entered into the securable device controller matches the PIN received by the controller from the mobile device, enabling, by the controller, the user to access the securable device,
otherwise, in response to verifying that the PIN entered into the securable device controller does not match the PIN received by the controller from the mobile device, preventing, by the controller, the securable device from being accessed by the user.

7. The method according to claim 1, further comprising storing, by the controller, the PIN submitted by the user in a data repository configured to store data associated with unprovisioned rentals.

8. The method according to claim 7, further comprising:
in response to receiving the PIN from a securable device controller of the securable device responsive to the user entering the PIN therein, verifying, by the controller, that the PIN from the securable device controller matches the PIN stored in the data repository with unprovisioned rentals; and
in response to verifying that the PIN entered into the securable device controller matches the PIN stored in the data repository with unprovisioned rentals, storing, by the controller, the PIN and the identifier of the securable device associated with the securable device controller in a second data repository configured to store data associated with provisioned securable devices.

9. The method according to claim 1, wherein receiving the request to rent the securable device includes receiving a reservation request.

10. The method according to claim 9, wherein receiving the request includes enabling a reservation request to be submitted from the user independent of a change of status of the securable device.

11. The method according to claim 9, wherein receiving the reservation request includes receiving a rental parameter indicative of a physical location of the securable device.

* * * * *